US012703190B2

(12) United States Patent
Usuki et al.

(10) Patent No.: US 12,703,190 B2
(45) **Date of Patent: *Aug. 11, 2026**

(54) PRINTER

(71) Applicant: FUJIFILM Corporation, Tokyo (JP)

(72) Inventors: Masaya Usuki, Tokyo (JP); Masayuki Sakai, Tokyo (JP); Keita Kamei, Tokyo (JP); Toshiaki Nagai, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/669,070

(22) Filed: May 20, 2024

(65) Prior Publication Data

US 2024/0308241 A1 Sep. 19, 2024

Related U.S. Application Data

(63) Continuation of application No. 16/807,264, filed on Mar. 3, 2020, now Pat. No. 12,023,943.

(30) Foreign Application Priority Data

Mar. 13, 2019 (JP) ................................ 2019-045787

(51) Int. Cl.
*B41J 3/46* (2006.01)
*B41J 3/36* (2006.01)
(Continued)

(52) U.S. Cl.
CPC ................ *B41J 3/36* (2013.01); *B41J 3/445* (2013.01); *B41J 3/46* (2013.01); *B41J 3/546* (2013.01);
(Continued)

(58) Field of Classification Search
CPC ....... B41J 3/36; B41J 3/46; B41J 3/445; B41J 3/546; H04N 1/0026; H04N 1/00188
See application file for complete search history.

(56) References Cited

U.S. PATENT DOCUMENTS 9,774,749 B1 9/2017 Skrainar et al.
2005/0052659 A1 3/2005 Jacobsen et al.
(Continued)

FOREIGN PATENT DOCUMENTS

CN 102902178 A 1/2013
CN 106998407 A 8/2017
(Continued)

OTHER PUBLICATIONS

An Office Action issued by China National Intellectual Property Administration on Mar. 9, 2024, which corresponds to Chinese Patent Application No. 202010149142.X and is related to U.S. Appl. No. 16/807,264; with English language translation.
(Continued)

*Primary Examiner* — Christopher E Mahoney
*Assistant Examiner* — Marissa Ferguson-Samreth
(74) *Attorney, Agent, or Firm* — Studebaker Brackett PLLC

(57) ABSTRACT

A printer having a printing unit that prints an image; a light emitting unit capable of switching colors of light emission; and a processor configured to: acquire an image to be printed from an external device; detect representative colors of regions by dividing the image to be printed by the printing unit into a plurality of regions; and control light emission of the light emitting unit, wherein the processor further configured to cause the light emitting unit to switch colors of the light emission based on the representative colors of the regions in order according to a printing progress of the image to be printed by the printing unit.

20 Claims, 17 Drawing Sheets

(51) Int. Cl.
*B41J 3/44* (2006.01)
*B41J 3/54* (2006.01)
*H04N 1/00* (2006.01)

(52) U.S. Cl.
CPC ..... *H04N 1/00188* (2013.01); *H04N 1/00206* (2013.01)

(56) References Cited

U.S. PATENT DOCUMENTS

| | | | |
|---|---|---|---|
| 2006/0250438 | A1 | 11/2006 | Silverbrook |
| 2009/0225213 | A1 | 9/2009 | Matsuyama et al. |
| 2013/0027737 | A1 | 1/2013 | Suzuki |
| 2014/0132977 | A1 | 5/2014 | Takahashi et al. |
| 2016/0288527 | A1* | 10/2016 | Hasegawa .............. B41J 2/2103 |
| 2017/0118382 | A1 | 4/2017 | Sugita et al. |
| 2020/0254772 | A1* | 8/2020 | Netsu .................. B41J 2/17509 |

FOREIGN PATENT DOCUMENTS

| | | | |
|---|---|---|---|
| EP | 2046064 | A1 | 4/2009 |
| JP | 2002-225351 | A | 8/2002 |
| JP | 2003-037761 | A | 2/2003 |
| JP | 2003-131848 | A | 5/2003 |
| JP | 2004-262092 | A | 9/2004 |
| JP | 2005-342924 | A | 12/2005 |
| JP | 2006-137007 | A | 6/2006 |
| JP | 2007-015227 | A | 1/2007 |
| JP | 2007-059997 | A | 3/2007 |
| JP | 2008-213250 | A | 9/2008 |
| JP | 2008-543599 | A | 12/2008 |
| JP | 2009-207121 | A | 9/2009 |
| KR | 10-2011-0059268 | A | 6/2006 |
| WO | 2008/044270 | A1 | 4/2008 |

OTHER PUBLICATIONS

An Office Action issued by China National Intellectual Property Administration on Sep. 28, 2023, which corresponds to Chinese Patent Application No. 202010149142.X and is related to U.S. Appl. No. 16/807,264; with English language translation.

An Office Action; "Notice of Reasons for Refusal," mailed by the Japanese Patent Office on Oct. 24, 2022, which corresponds to Japanese Patent Application No. 2022-025845 and is related to U.S. Appl. No. 16/807,264; with English language translation.

Seth Halleran, "Comparative review: The best pocket printer of 2019", Digital Photography Review, URL:https://www.dpreview.com/reviews/buying-guide-the-best-pocket-printer-for-the-money, Jan. 27, 2019.

The extended European search report issued by the European Patent Office on Jul. 16, 2020, which corresponds to European Patent Application No. 20159049.4-1209 and is related to U.S. Appl. No. 16/807,264.

* cited by examiner 105
100
12
10
14
16

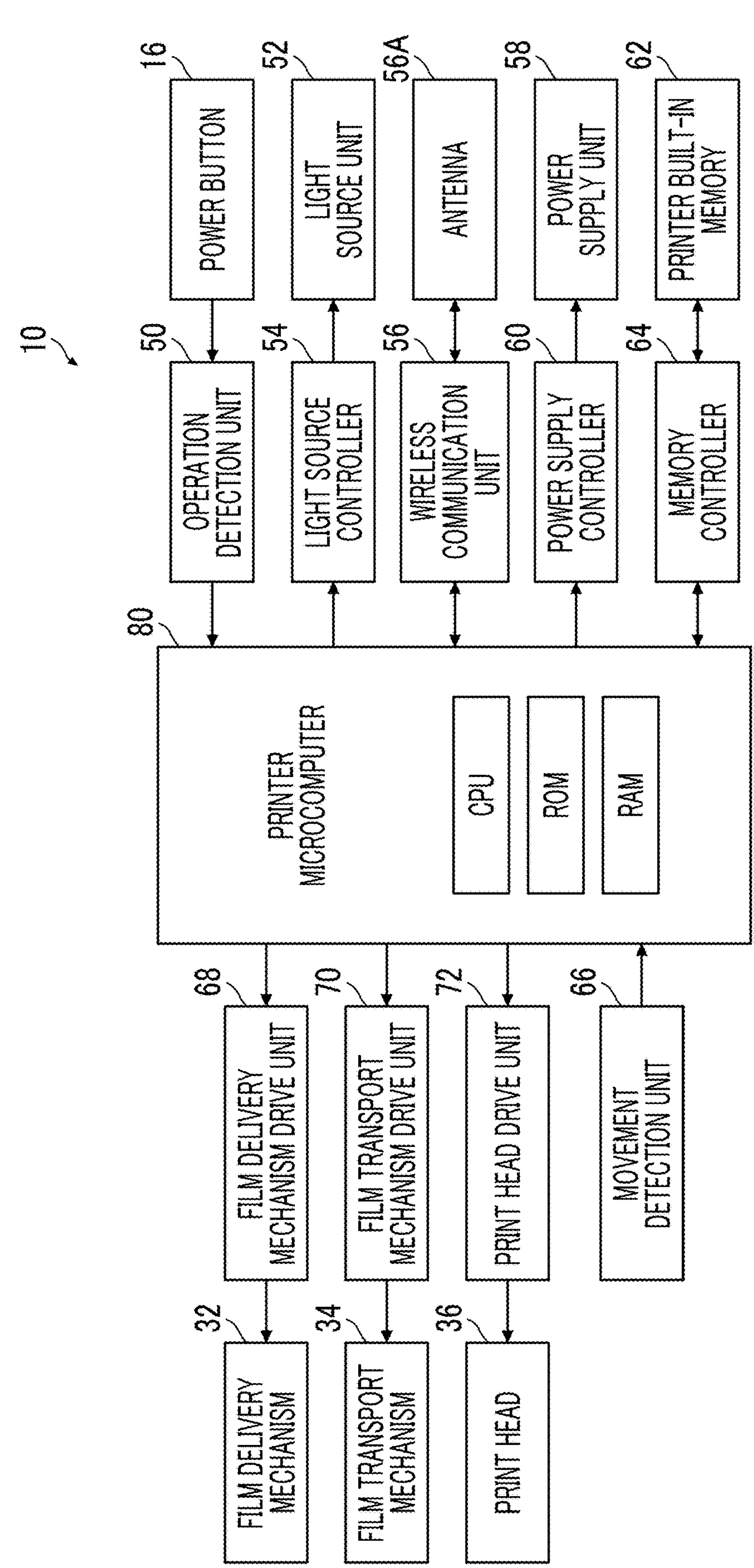
FIG. 8
10
16
POWER BUTTON
52
LIGHT SOURCE UNIT
56A
ANTENNA
58
POWER SUPPLY UNIT
62
PRINTER BUILT-IN MEMORY
50
OPERATION DETECTION UNIT
54
LIGHT SOURCE CONTROLLER
56
WIRELESS COMMUNICATION UNIT
60
POWER SUPPLY CONTROLLER
64
MEMORY CONTROLLER
80
PRINTER MICROCOMPUTER
CPU
ROM
RAM
68
FILM DELIVERY MECHANISM DRIVE UNIT
70
FILM TRANSPORT MECHANISM DRIVE UNIT
72
PRINT HEAD DRIVE UNIT
66
MOVEMENT DETECTION UNIT
32
FILM DELIVERY MECHANISM
34
FILM TRANSPORT MECHANISM
36
PRINT HEAD

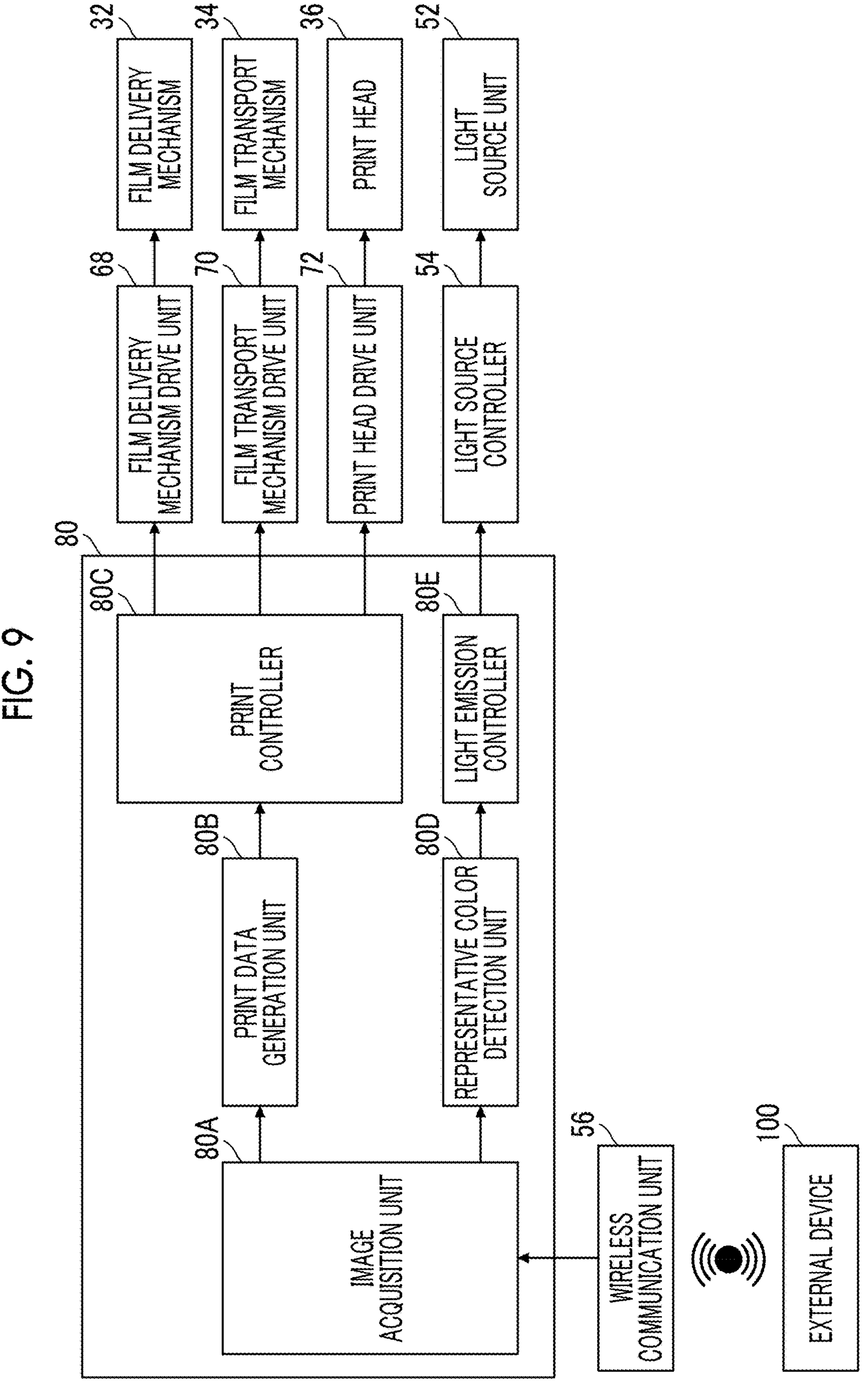
FIG. 9
80
80A
IMAGE ACQUISITION UNIT
80B
PRINT DATA GENERATION UNIT
80C
PRINT CONTROLLER
80D
REPRESENTATIVE COLOR DETECTION UNIT
80E
LIGHT EMISSION CONTROLLER
68
FILM DELIVERY MECHANISM DRIVE UNIT
70
FILM TRANSPORT MECHANISM DRIVE UNIT
72
PRINT HEAD DRIVE UNIT
54
LIGHT SOURCE CONTROLLER
32
FILM DELIVERY MECHANISM
34
FILM TRANSPORT MECHANISM
36
PRINT HEAD
52
LIGHT SOURCE UNIT
56
WIRELESS COMMUNICATION UNIT
100
EXTERNAL DEVICE START
S11
DETECT PRINTER
S12
IS PRINTER DETECTED?
N
Y
S13
DISPLAY ERROR
S14
IS IMAGE CAPTURED AND PRINTED?
N
Y
S15
IMAGING
S16
SELECT IMAGE
S17
IS IMAGE EDITED?
N
Y
S18
EDIT IMAGE
S19
IS PRINT COMMAND ISSUED?
N
Y
S20
CANCEL?
N
Y
S21
TRANSMIT IMAGE
END

FIG. 14

100
100A
PRINT IMAGE ACQUISITION UNIT
100B
PRINT IMAGE PROCESSING UNIT
100C
PRINT IMAGE TRANSMISSION UNIT
100D
PRINT IMAGE REPRESENTATIVE COLOR DETECTION UNIT
100E
LIGHT EMISSION PATTERN INFORMATION TRANSMISSION UNIT
106
TOUCH PAD
108
CAMERA UNIT
104
BUILT-IN MEMORY
105
DISPLAY
112
SHORT RANGE WIRELESS COMMUNICATION UNIT
10
PRINTER

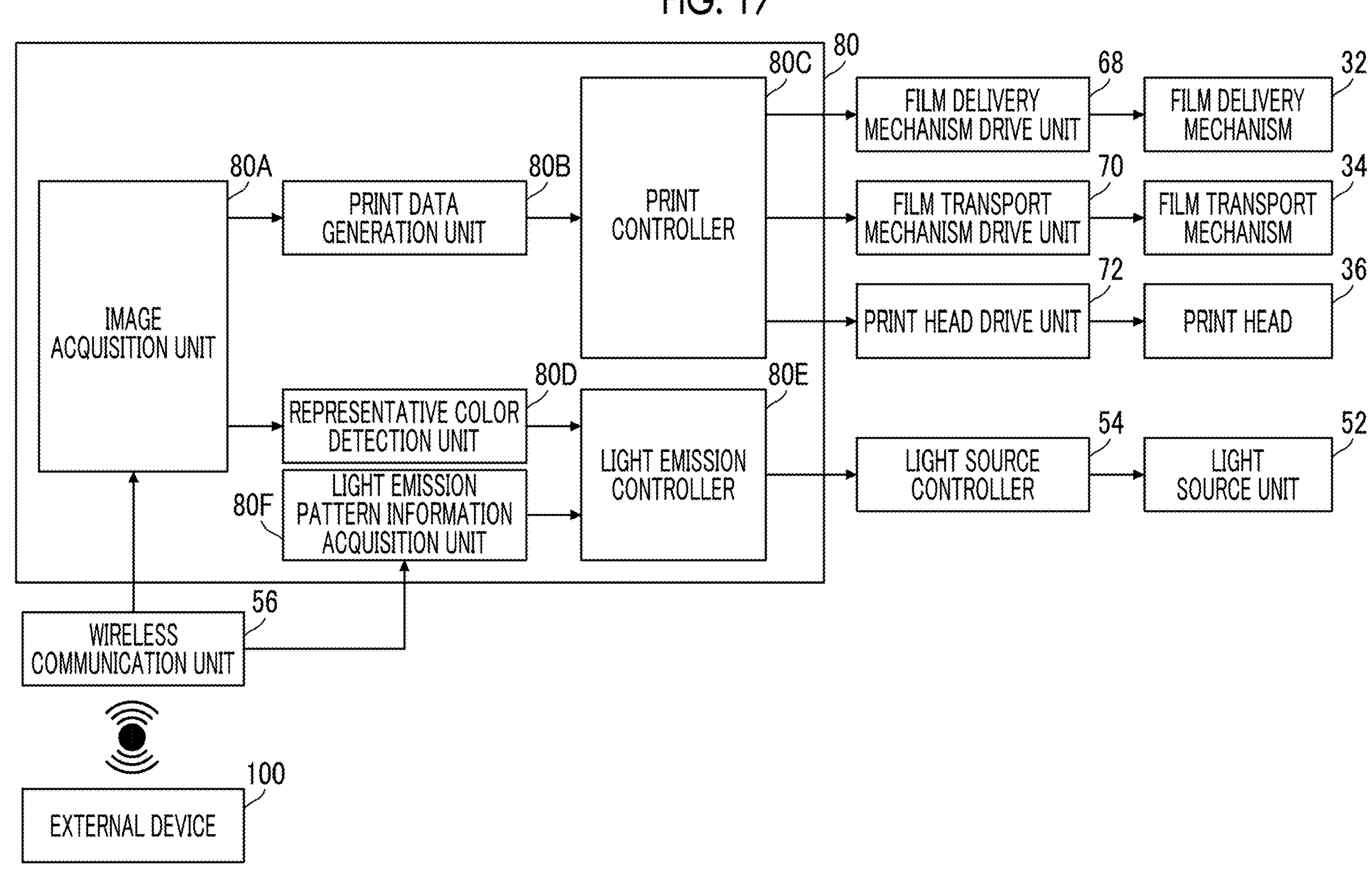
FIG. 17
80
80A
IMAGE ACQUISITION UNIT
80B
PRINT DATA GENERATION UNIT
80C
PRINT CONTROLLER
80D
REPRESENTATIVE COLOR DETECTION UNIT
80F
LIGHT EMISSION PATTERN INFORMATION ACQUISITION UNIT
80E
LIGHT EMISSION CONTROLLER
68
FILM DELIVERY MECHANISM DRIVE UNIT
70
FILM TRANSPORT MECHANISM DRIVE UNIT
72
PRINT HEAD DRIVE UNIT
54
LIGHT SOURCE CONTROLLER
32
FILM DELIVERY MECHANISM
34
FILM TRANSPORT MECHANISM
36
PRINT HEAD
52
LIGHT SOURCE UNIT
56
WIRELESS COMMUNICATION UNIT
100
EXTERNAL DEVICE

PRINTER

CROSS-REFERENCE TO RELATED APPLICATIONS

The present application is a Continuation of U.S. patent application Ser. No. 16/807,264, filed on Mar. 3, 2020, which claims benefit of priority under 35 U.S.C. § 119 to Japanese Patent Application No. 2019-045787, filed on Mar. 13, 2019. Each of the above applications is hereby expressly incorporated by reference, in its entirety, into the present application.

BACKGROUND OF THE INVENTION

1. Field of the Invention

The present invention relates to a printer.

2. Description of the Related Art

In a printer that does not include a display, an operation state of the printer is generally notified to the outside by using a lamp such as a light emitting diode (LED) (for example, JP2007-015227A).

Meanwhile, WO2008/044270A suggests a technology for extracting a region of interest from an image, selecting a representative color from a color distribution of an image of the extracted region of interest, and causing an LED to emit light in a light emission pattern corresponding to the representative color. According to WO2008/044270A, a feature and an atmosphere of an image can be recognized from the light emission pattern of the LED.

SUMMARY OF THE INVENTION

However, even though the technology described in WO2008/044270A is applied to a printer, the operation state of the printer, in particular, printing progress of the printer cannot be recognized by simply recognizing the feature and atmosphere of the image to be printed.

The present invention has been made in view of such circumstances, and an object of the present invention is to provide a printer capable of recognizing a feature and an atmosphere of an image to be printed and recognizing printing progress.

(1) A printer comprises an image acquisition unit that acquires an image to be printed from an external device, a printing unit that prints the image acquired by the image acquisition unit, a representative color detection unit that detects representative colors of regions by dividing the image to be printed by the printing unit into a plurality of regions, a light emitting unit that switches between light emission colors, and a light emission controller that controls light emission of the light emitting unit. The light emission controller emits light while switching between the representative colors of the regions detected by the representative color detection unit in order according to printing progress in a case where the image is printed by the printing unit.

(2) In the printer according to (1), the representative color detection unit detects the representative colors of the regions by dividing the image to be printed by the printing unit into the plurality of regions along an up-down direction of the image.

(3) In the printer according to (2), the light emission controller divides a time from when the printing is started to when the printing is ended according to an area ratio of the divided regions, and switches between the light emission colors at divided time intervals.

(4) In the printer according to any one of (1) to (3), in a case where the image acquisition unit acquires the image to be printed from the external device, the light emission controller causes the light emitting unit to emit light in a preset light emission pattern.

(5) In the printer according to (4), the light emission pattern is a light emission pattern for switching between a plurality of light emission colors in order.

(6) The printer according to any one of (1) to (3) further comprises a light emission pattern information acquisition unit that acquires information of a light emission pattern from the external device before the image acquisition unit acquires the image to be printed from the external device. In a case where the image acquisition unit acquires the image to be printed from the external device, the light emission controller causes the light emitting unit to emit the light in the light emission pattern acquired by the light emission pattern information acquisition unit.

(7) In the printer according to (6), in a case where the image to be printed is divided into the plurality of regions, the information of the light emission pattern acquired by the light emission pattern information acquisition unit is information of a light emission pattern for emitting the representative colors of the divided regions in order.

(8) In the printer according to any one (1) to (7), in a case where the light emitting unit emits light while switching between the light emission colors, the light emission controller causes the light emitting unit to emit light while switching between the light emission colors in a gradation form.

(9) In the printer according to any one of (1) to (8), in a case where the representative color emitted by the light emitting unit is an achromatic color, the light emission controller causes the light emitting unit to emit light in a predetermined color.

(10) In the printer according to (9), in a case where the representative color emitted by the light emitting unit is the achromatic color, the light emission controller causes the light emitting unit to emit light in a predetermined light emission pattern.

(11) In the printer according to any one of (1) to (7), in a case where the representative color emitted by the light emitting unit is an achromatic color, the light emission controller causes the light emitting unit not to emit light.

(12) In the printer according to any one of (1) to (11), the printing unit prints the image acquired by the image acquisition unit on an instant film.

(13) The printer according to any one of (1) to (12) further comprises a wireless communication unit that wirelessly communicates with the external device. The image acquisition unit wirelessly acquires the image to be printed from the external device through the wireless communication unit.

(14) In the printer according to any one of (1) to (13), the printer is a portable mobile printer.

According to the present invention, it is possible to recognize the feature and atmosphere of the image to be printed, and it is possible to recognize the printing progress.

BRIEF DESCRIPTION OF THE DRAWINGS

FIG. 4 is a cross-sectional view showing a schematic configuration of a printing unit of the printer.

FIG. 5 is a perspective view of a film pack.

FIG. 8 is a block diagram showing an electrical configuration of the printer.

FIG. 9 is a block diagram of main functions realized by a printer microcomputer.

FIG. 14 is a flowchart showing a processing procedure in the printer.

FIG. 17 is a block diagram of functions of the printer in a case where a light emitting unit emits light according to information on a light emission pattern received from the external device.

DESCRIPTION OF THE PREFERRED EMBODIMENTS

Hereinafter, a preferred embodiment of the present invention will be described with reference to the accompanying drawings.

Printing System

Figure 1:
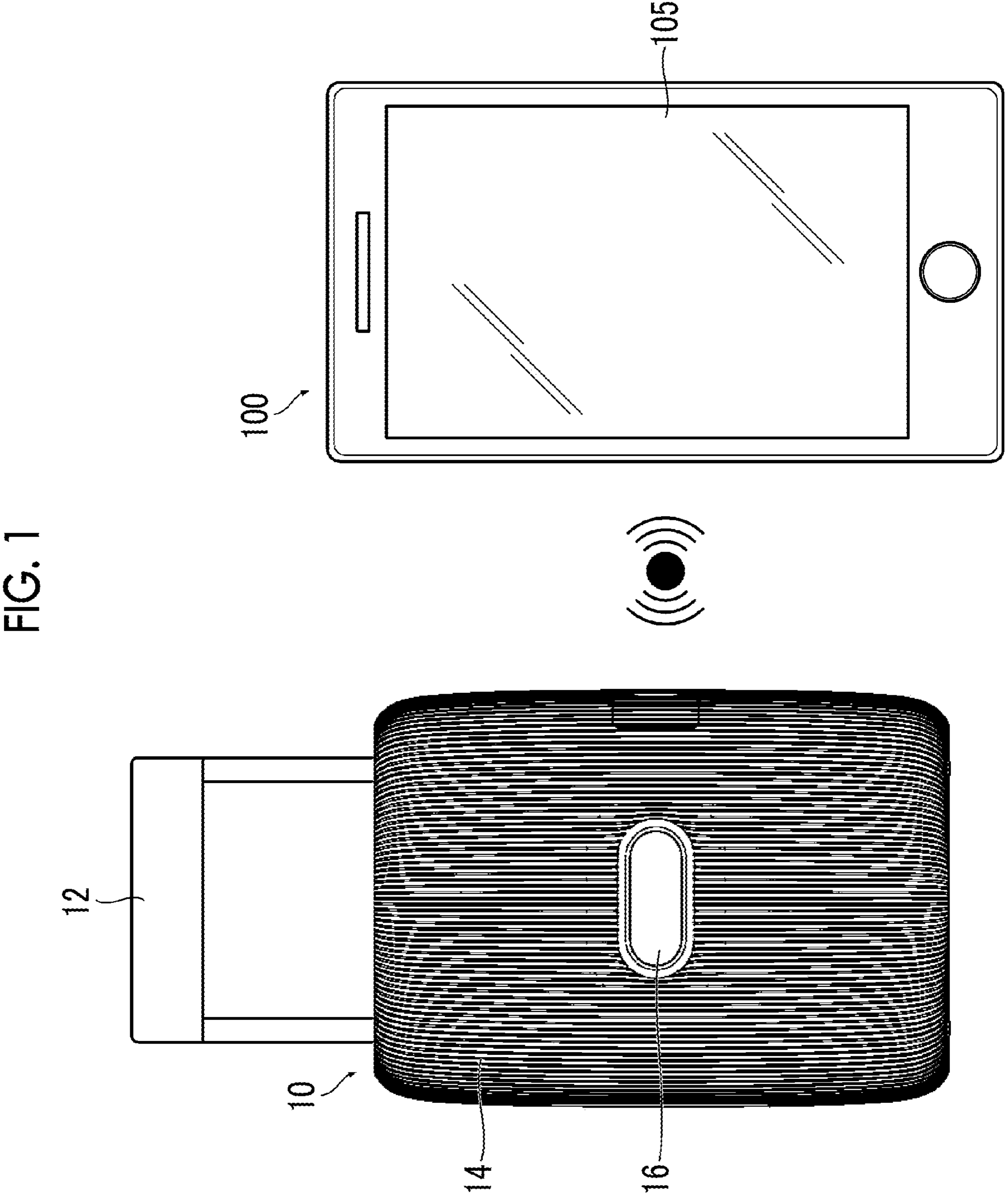
FIG. 1 is a diagram showing an example of a system configuration of a system that prints an image by using a printer according to an embodiment.

FIG. 1 is a diagram showing an example of a system configuration of a system that prints an image by using a printer of the present embodiment.

A printer 10 according to the present embodiment is a portable mobile printer, and wirelessly receives an image to be printed from an external device and prints the received image on a medium. As the medium, a sheet film type (also referred to as a mono sheet type) instant film 12 is used.

An external device 100 is a computer having a communication function, in particular, a mobile computer such as a smartphone, a tablet terminal, a laptop personal computer, a personal data assistant (PDA), and a mobile phone. FIG. 1 shows an example in which the external device is a smartphone.

For example, communication between the printer 10 and the external device is performed in conformity to a short range wireless communication standard such as near-field communication (NFC) standard, Bluetooth (registered trademark), and Wireless Fidelity (WiFi).

Appearance Configuration of Printer

Figure 2:
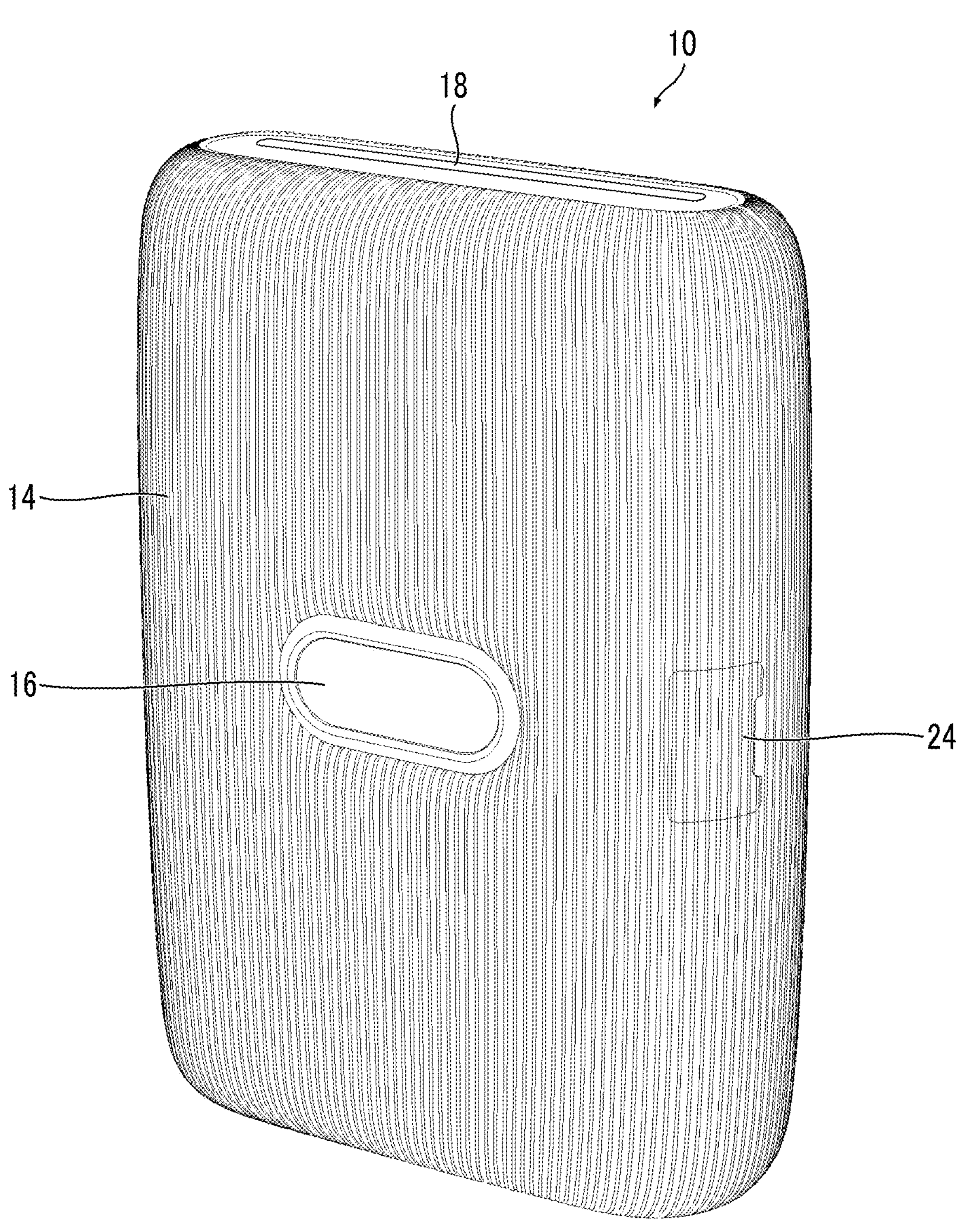
FIG. 2 is a front perspective view showing an example of an appearance configuration of the printer according to the embodiment.
Figure 3:
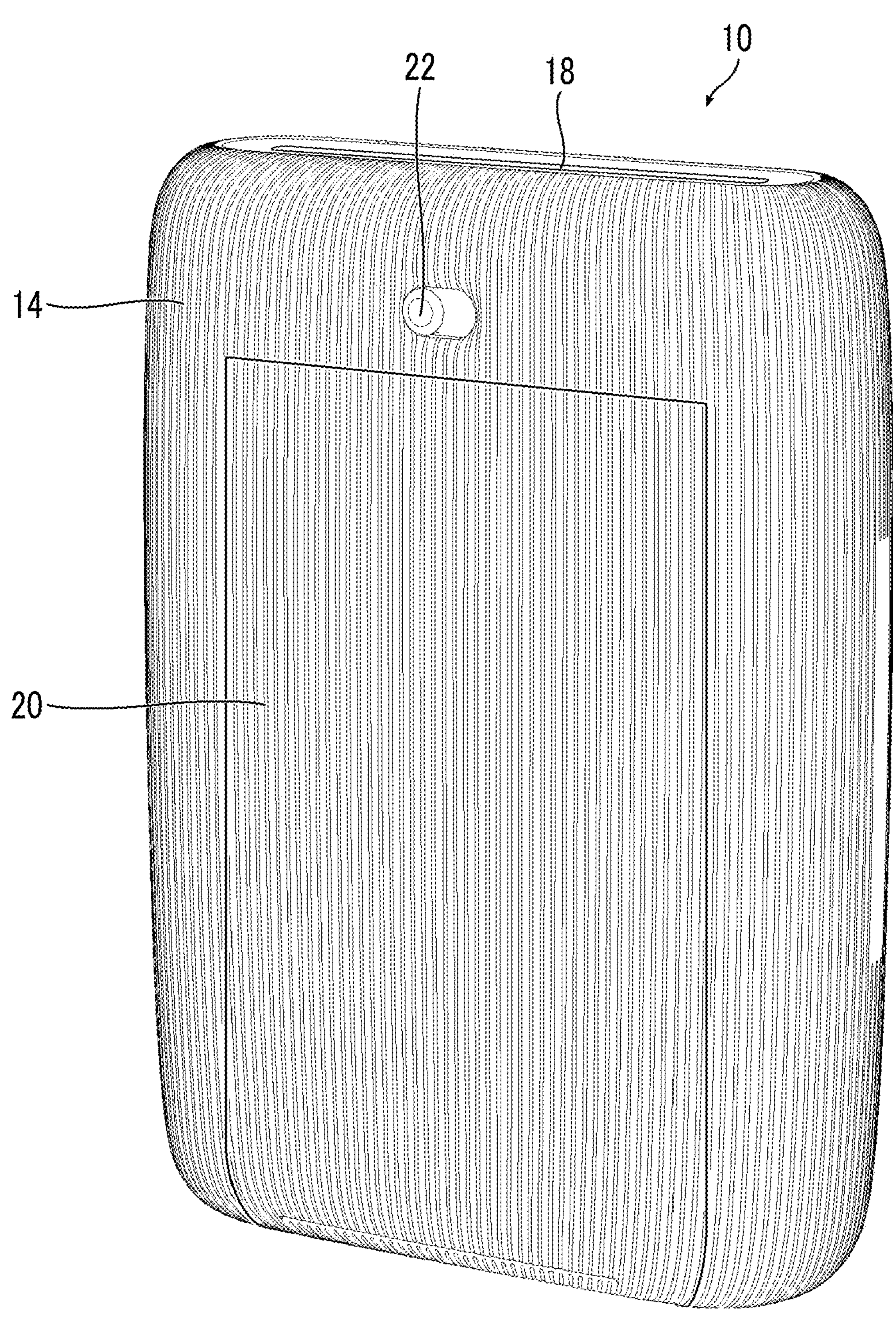
FIG. 3 is a rear perspective view of the printer shown in FIG. 2.

FIG. 2 is a front perspective view showing an example of an appearance configuration of the printer according to the present embodiment. FIG. 3 is a rear perspective view of the printer shown in FIG. 2.

As described above, the printer 10 is an instant printer (printer that prints on an instant film). The instant film 12 is loaded into the printer 10 in a state of a film pack (see FIG. 5) in which a plurality of instant films is accommodated in a case.

An outer casing 14 of the printer 10 has a rounded flat rectangular box shape and is configured to be portable by being held with one hand. The outer casing 14 of the printer 10 is configured to be vertically placed (stand upright on a flat place) and horizontally placed (laid on a flat place). FIGS. 1 and 2 show a case where the printer 10 is vertically placed.

On a front side of the printer 10, a push-type power button 16 is provided at a substantially central position. The printer 10 is powered on and off by a long push of the power button 16 (an operation of continuously pushing the power button for a predetermined time or more). The power button 16 also serves as a light emitting unit, and emits light by causing a light source unit provided therein to emit light. The aforementioned points will be described below.

A discharge port 18 is provided at an upper portion of the printer 10 (upper portion when the printer is vertically placed). The printed instant film 12 is discharged from the discharge port 18.

A film pack lid 20 for opening and closing a film pack loading chamber (see FIG. 4) is provided on a rear side of the printer 10. An unlock lever 22 that unlocks the film pack lid 20 is provided. In a case where the unlock lever 22 releases the lock and the film pack lid 20 is opened, the film pack loading chamber is opened. When the film pack lid 20 is closed after the instant film pack is loaded, the film pack lid 20 is locked by a lock mechanism (not shown), and the film pack is sealed in a light-shielded state.

A USB cable connection portion cover 24 that opens and closes a Universal Serial Bus (USB) cable connection portion (not shown) is provided on one side of the printer 10. The printer 10 is charged with a built-in battery through the USB cable connection portion exposed by opening the USB cable connection portion cover 24.

Configuration of Printing Unit of Printer

Figure 4:
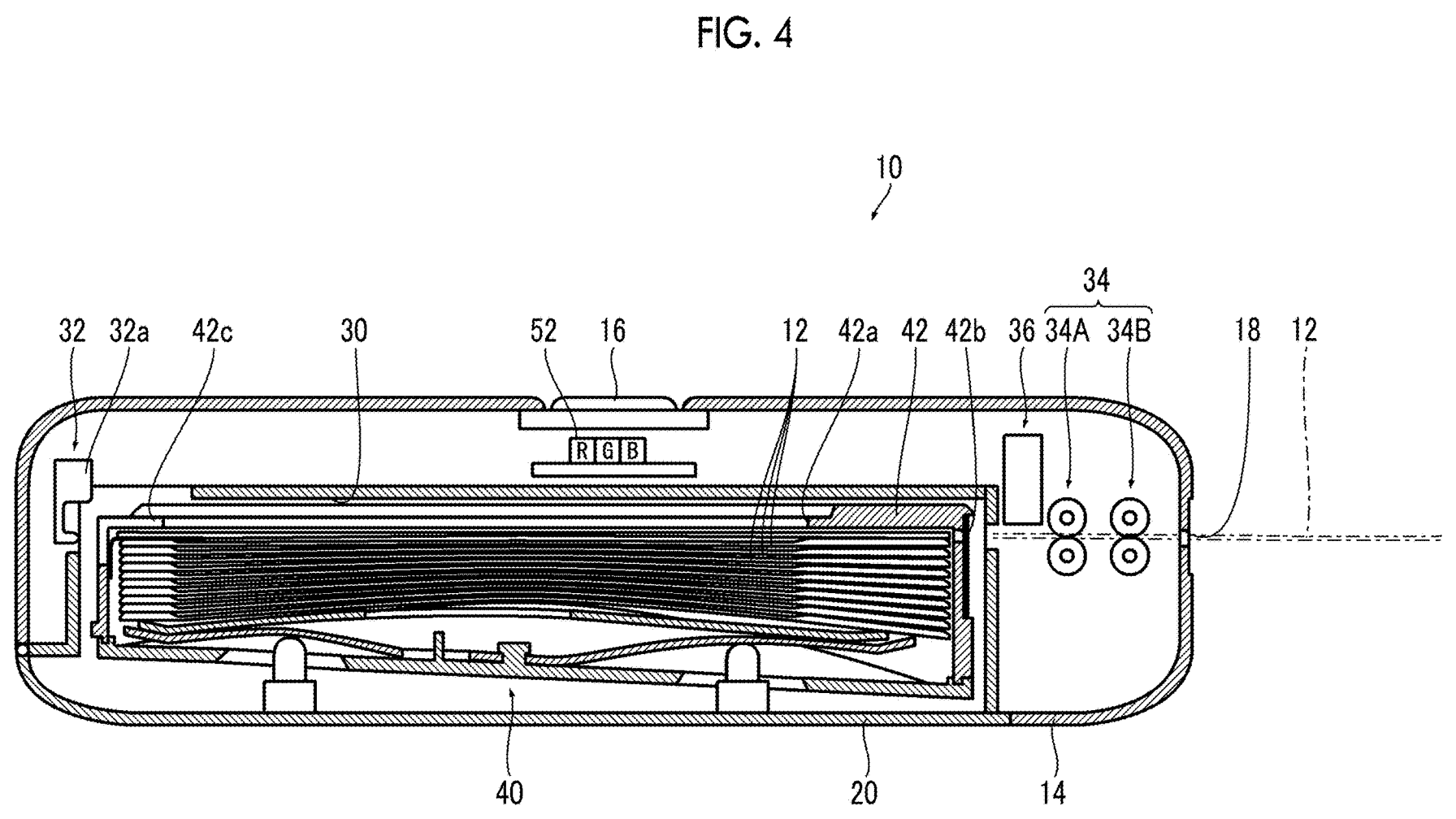

FIG. 4 is a cross-sectional view showing a schematic configuration of a printing unit of the printer. This diagram shows a state in which the printer is horizontally placed.

As shown in this diagram, the printer 10 comprises, as the printing unit, a film pack loading chamber 30, a film delivery mechanism 32 that delivers the instant film 12 from the film pack loaded in the film pack loading chamber 30, a film transport mechanism 34 that transports the sent instant film 12 delivered from the film pack, and a print head 36 that records an image on the instant film 12 therein.

The film pack loading chamber 30 includes a recess into which a film pack 40 is fitted, and is opened and closed by the film pack lid 20.

Figure 5:
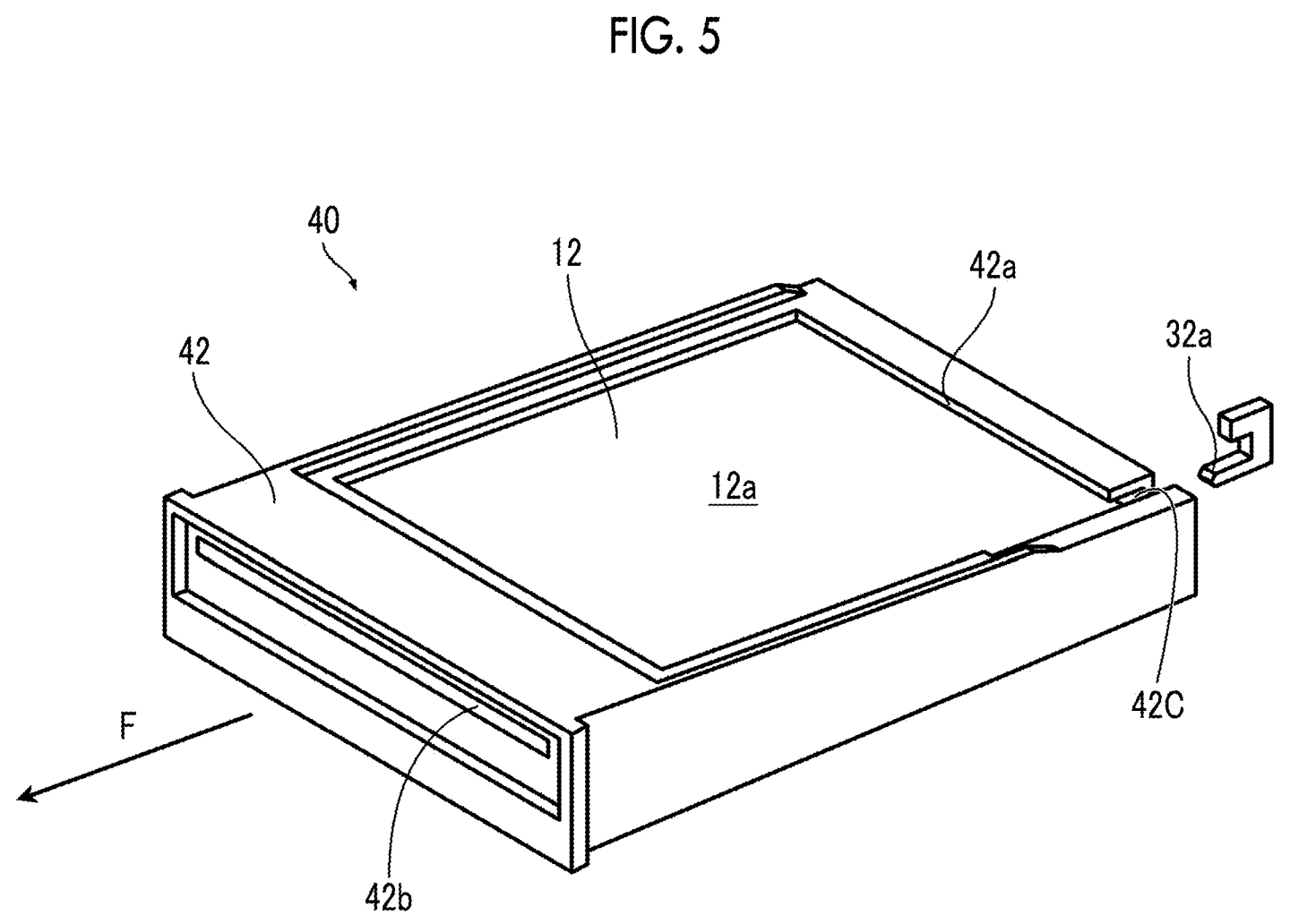
Figure 6:
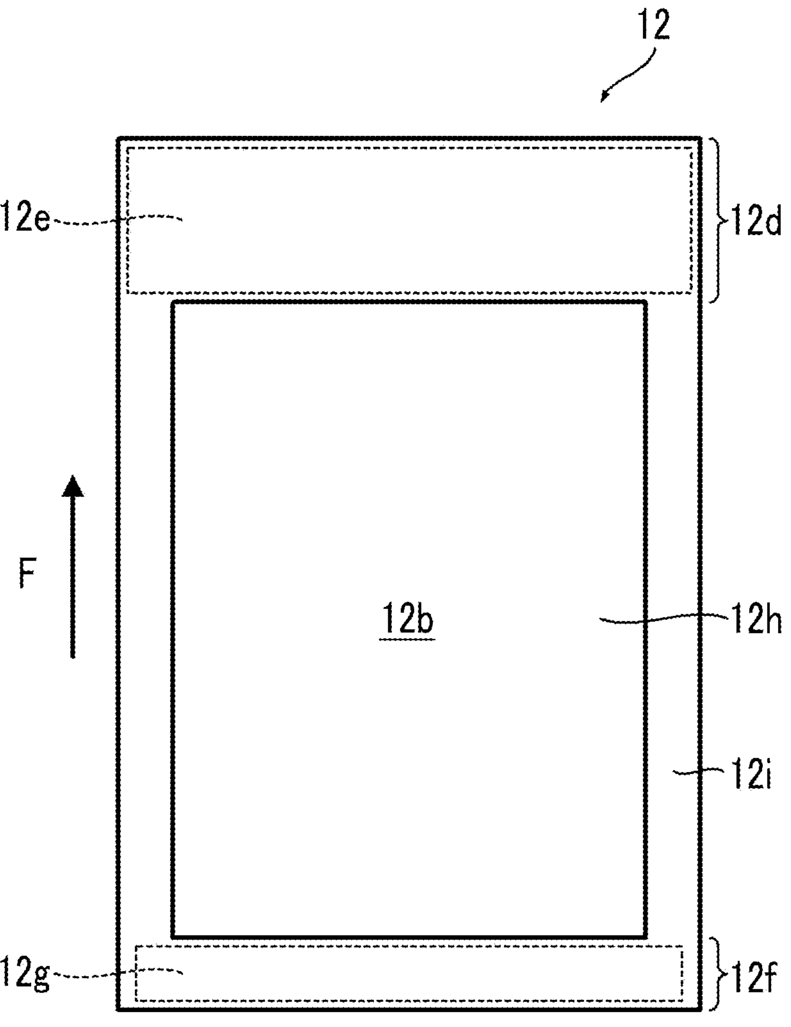
FIG. 6 is a front view of the instant film.
Figure 7:
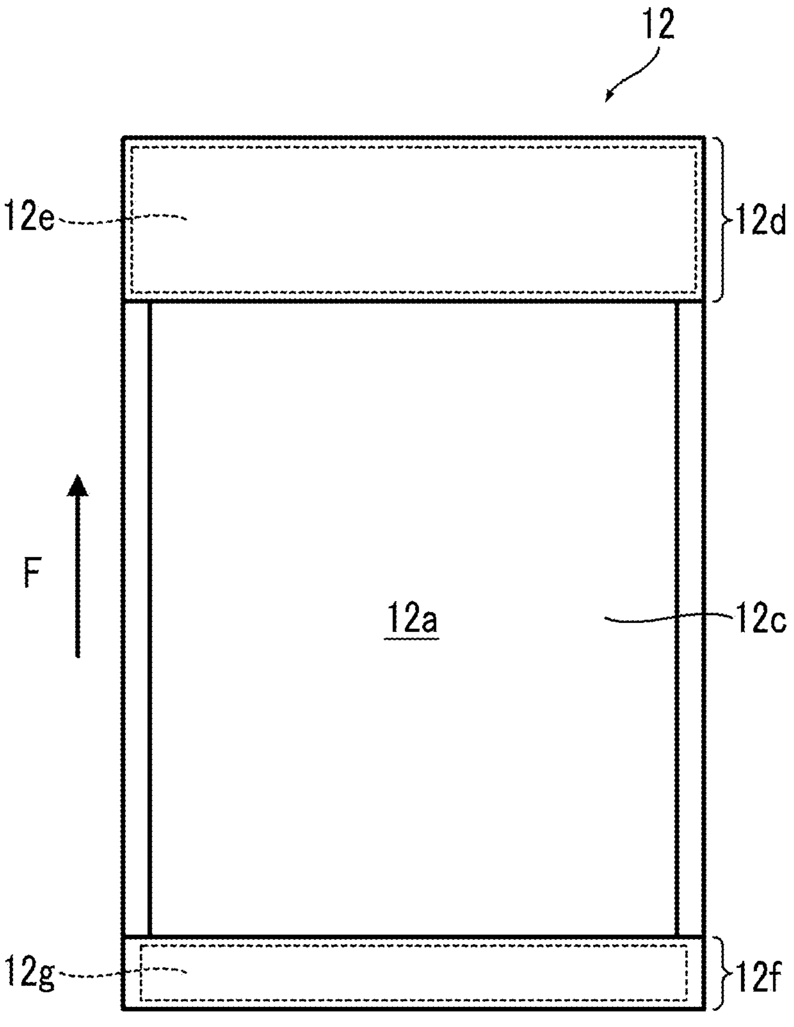
FIG. 7 is a rear view of the instant film.

FIG. 5 is a perspective view of the film pack. FIG. 6 is a front view of the instant film, and FIG. 7 is a rear view of the instant film. In FIGS. 5 to 7, a direction indicated by an arrow F is a delivery direction of the instant film 12. The instant film 12 is delivered in the direction indicated by the arrow F, and is discharged from the case 42.

The instant film 12 has a rectangular card shape. The instant film 12 is configured such that one surface is an exposure surface (surface on which an image is recorded through exposing) **12*a* and the other surface is an observation surface (surface on which the recorded image is observed) 12*b***.

As shown in FIG. 7, an exposure region **12*c*, a pod portion 12*d*, and a trap portion 12*f* are provided on the exposure surface 12*a* of the instant film 12. The exposure region 12*c*** is a region in which the image is recorded through exposing.

The exposure region 12*c* is a region in which the instant film 12 can be printed. The pod portion 12*d* and the trap portion 12*f* are arranged in front and back in the delivery direction F with the exposure region 12*c* interposed therebetween. The pod portion 12*d* is disposed in front in the delivery direction F with respect to the exposure region 12*c*. A developing solution pod 12*e* that contains a developing solution is provided within the pod portion 12*d*. The trap portion 12*f* is disposed in the back in the delivery direction F with respect to the exposure region 12*c*. An absorbent 12*g* is provided within the trap portion 12*f*.

As shown in FIG. 6, an observation region 12*h* is formed on the observation surface 12*b* of the instant film 12. The observation region 12*h* is a region in which the image is displayed. The image is displayed on the observation region 12*h* by developing the exposure region 12*c*. The observation region 12*h* is disposed so as to correspond to the exposure region 12*c*. A frame 12*i* is provided near the observation region 12*h*. Accordingly, the image is displayed within the frame. The observation region 12*h* is set so as to be slightly narrower (set so as to be one size smaller) than the exposure region 12*c*. Accordingly, in a case where the image is recorded in the entire region of the exposure region 12*c*, the image of which the surrounding is trimmed is printed.

The instant film 12 is viewed in an orientation in which the trap portion 12*f* is at the top and the pod portion 12*d* is at the bottom. Accordingly, the image is printed in an orientation in which the trap portion 12*f* is at the top and the pod portion 12*d* is at the bottom.

The instant film 12 is developed by spreading the developing solution of the pod portion 12*d* to the exposure region 12*c* after exposing. The developing solution of the pod portion 12*d* is squeezed out of the pod portion 12*d*, and is spread to the exposure region 12*c* by causing the instant film 12 to pass between a spreading roller pair 34B. The developing solution remaining at the time of spreading is captured in the trap portion 12*f*.

The case 42 has a rectangular box shape. The case 42 has a rectangular exposure opening 42*a* formed in a front portion. The case 42 has a slit-like film discharge port 42*b* on the top surface portion. The instant films 12 are accommodated so as to be stacked such that the exposure surface 12*a* faces a front surface (exposure opening 42*a*) of the case 42 and the pod portion 12*d* faces a top surface (film discharge port 42*b*) of the case 42. The case 42 has a slit-like claw opening portion 42*c* formed in a bottom portion. A claw 32*a* enters through the claw opening portion 42*c*, and thus, the instant films 12 accommodated in the case 42 are delivered toward the film discharge port 42*b* one by one and are discharged through the film discharge port 42*b*.

A plurality (for example, ten) of instant films 12 is accommodated so as to be stacked in one film pack 40.

The film delivery mechanism 32 delivers the instant films 12 one by one from the film pack 40 loaded in the film pack loading chamber 30. The film delivery mechanism 32 comprises the claw 32*a* that moves back and forth along the delivery direction of the instant film 12. The film delivery mechanism 32 scrapes the instant films 12 within the case one by one by the claw 32*a*, and delivers the instant film 12 from the film pack 40.

The film transport mechanism 34 transports the instant film 12 delivered from the film pack 40 by the film delivery mechanism 32 at a constant speed. The film transport mechanism 34 comprises a transport roller pair 34A and the spreading roller pair 34B. The transport roller pair 34A is rotated by being driven by a motor (not shown), and transports the instant film 12 while holding both sides of the instant film. The spreading roller pair 34B is rotated by being driven by a motor (not shown), and transports the instant film 12 while holding the entire instant film. The pod portion 12*d* is crushed while the instant film is transported by the spreading roller pair 34B, and the instant film 12 is developed.

The print head 36 records the image on the instant film 12 delivered from the film pack 40. The print head 36 is a line-type exposure head. The print head 36 irradiates the exposure surface 12*a* of the instant film 12 transported by the film transport mechanism 34 with print light line by line, and records the image on the instant film 12 in a single pass.

Electrical Configuration of Printer

FIG. 8 is a block diagram showing an electrical configuration of the printer.

As shown in this diagram, the printer 10 comprises an operation detection unit 50 that detects an operation of the power button 16, a light source unit 52 that emits light from the power button 16, a light source controller 54 that controls the light emission of the light source unit 52, a wireless communication unit 56 that wirelessly communicates with an external device via an antenna 56A, a power supply unit 58, a power supply controller 60 that controls power supply from the power supply unit 58 and charging of the power supply unit 58, a printer built-in memory 62, a memory controller 64 that reads and writes data in the printer built-in memory 62, a movement detection unit 66 that detects the movement of the printer 10, a film delivery mechanism drive unit 68 that drives the film delivery mechanism 32, a film transport mechanism drive unit 70 that drives the film transport mechanism 34, a print head drive unit 72 that drives the print head 36, and a printer microcomputer 80.

The operation detection unit 50 detects the operation of the power button 16. The power button 16 is a push button, and the printer 10 is powered on and off by long push. While the power button is powered on, a function for inputting a reprint command is assigned to the power button 16. The reprinting is a function for reprinting the last printed image. The operation detection unit 50 detects a short push (operation of pushing and then releasing immediately) of the power button 16 while the printer 10 is powered on, and outputs a detection signal to the printer microcomputer 80.

The light source unit 52 is configured to switch light emission colors. In the printer 10 of the present embodiment, the light source unit 52 is a three-color LED (also referred to as a full-color LED) comprising three color elements of red (R), green (G), and blue (B). The light emission colors of the three-color LED are switched by selecting a mixing ratio of three colors of R, G, and B. Since this main light source is known, a detailed description thereof will be omitted.

The light source unit 52 is disposed inside the power button 16 (see FIG. 4). The power button 16 is entirely or partially transparent (or translucent), and in a case where the light source unit 52 emits light, light is transmitted through the transparent portion (or translucent portion) and is emitted.

The light source controller 54 causes the light source unit 52 to emit light with a predetermined light emission color and light emission pattern according to a command from the printer microcomputer 80.

The wireless communication unit 56 wirelessly communicates with an external device through the antenna 56A under the control using the printer microcomputer 80. As described above, the communication with the external device is performed in conformity to the short range wireless communication standard.

The power supply unit 58 includes a battery and a power supply circuit, and supplies a power to each unit of the printer 10. The battery is a rechargeable secondary battery, and is charged by receiving a power from the outside.

The power supply controller 60 controls the supply of the power from the power supply unit 58 to each unit and the charging of the battery of the power supply unit 58 under the control of the printer microcomputer 80.

The printer built-in memory 62 constitutes a storage unit of the printer 10, and stores printed image data and setting data of the printer 10. The printer built-in memory 62 is, for example, a nonvolatile memory such as an electrically erasable programmable read-only memory (EEPROM).

The memory controller 64 reads and writes data from and in the printer built-in memory 62 in response to a command from the printer microcomputer 80.

The movement detection unit 66 detects the movement of the printer 10. The movement detection unit 66 is, for example, a motion sensor. Since the motion sensor itself is well-known, the detailed description is omitted. In general, the motion sensor is configured by combining an acceleration sensor and a gyro sensor. The movement detection unit 66 detects the posture of the printer 10 (vertical placement, horizontal placement, tilt, etc.) and movement of the printer 10 (lifting, placing down, turning over, etc.).

The film delivery mechanism drive unit 68 includes a motor that drives the claw 32*a* of the film delivery mechanism 32 and a drive circuit thereof, and drives the film delivery mechanism 32 according to a command from the printer microcomputer 80.

The film transport mechanism drive unit 70 includes a motor that drives the transport roller pair 34A of the film transport mechanism 34 and a drive circuit thereof, and a motor that drives the spreading roller pair 34B and a drive circuit thereof, and drives the film transport mechanism 34 according to a command from the printer microcomputer 80.

The print head drive unit 72 includes a drive circuit of the print head 36, and drives the print head 36 according to a command from the printer microcomputer 80.

The printer microcomputer 80 is a controller that performs overall control of the operation of the printer 10. The printer microcomputer 80 is a microcomputer that comprises a central processing unit (CPU), a read only memory (ROM), and a random access memory (RAM), and realizes various functions by executing predetermined control programs.

FIG. 9 is a block diagram of main functions realized by the printer microcomputer.

The printer microcomputer 80 mainly functions as an image acquisition unit 80A, a print data generation unit 80B, a print controller 80C, a representative color detection unit 80D, and a light emission controller 80E.

The image acquisition unit 80A wirelessly communicates with the external device 100 via the wireless communication unit 56, and acquires image data of an image to be printed from the external device 100. In the case of reprinting, the image data of the last printed image is read out from the printer built-in memory 62 and is acquired.

The print data generation unit 80B converts the image data acquired by the image acquisition unit 80A into a data format printable by the printing unit (data format printable on the instant film 12 by the print head 36), and generates data for printing (print data).

The print controller 80C controls the delivery of the instant film 12 by the film delivery mechanism 32 via the film delivery mechanism drive unit 68. The transport of the instant film 12 by the film transport mechanism 34 is controlled via the film transport mechanism drive unit 70. The driving of the print head 36 is controlled via the print head drive unit 72. The driving of the print head 36 is controlled in synchronization with the transport of the instant film 12 based on the print data generated by the print data generation unit 80B.

The representative color detection unit 80D divides the image to be printed into a plurality of regions along an up-down direction of the image, analyzes an image of each divided region, and detects a representative color. The representative color is a color used centrally in the corresponding region. For example, the representative color detection unit 80D obtains a color distribution of the image of each region, and detects the color occupying the widest area as the representative color of the region. At this time, the representative color detection unit 80D detects the representative color of each region within a color gamut range reproducible in the light source unit 52.

Figure 10:
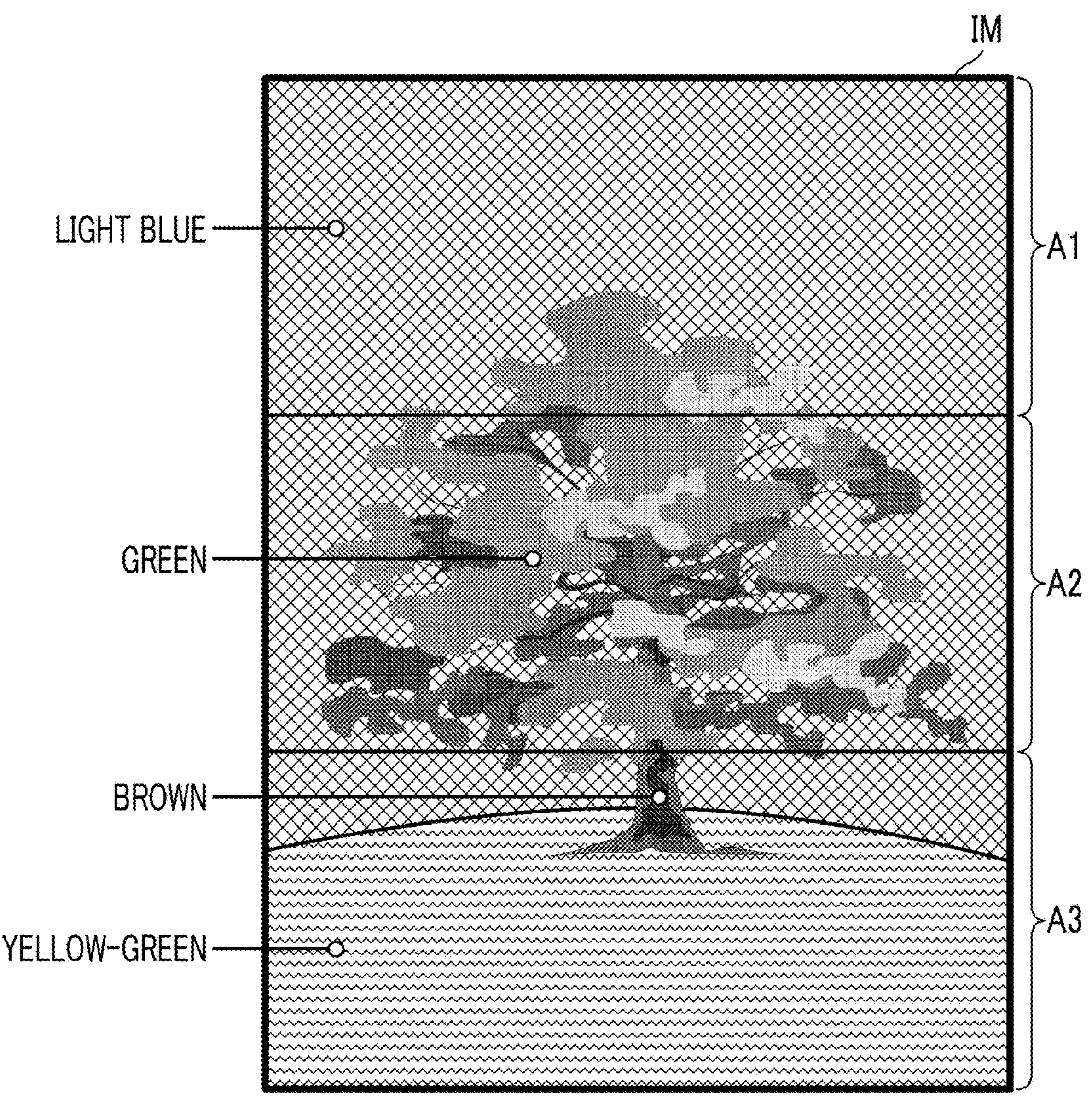
FIG. 10 is a diagram showing an example of division of an image.

FIG. 10 is a diagram showing an example of the division of the image.

As shown in this diagram, in the printer 10 of the present embodiment, an image IM is divided into three equal regions along the up-down direction (upper region A1, intermediate region A2, and lower region A3), and the representative colors of the regions A1, A2, A3 are detected. The up-down direction of the image mentioned herein is the up-down direction (vertical direction) at the time of observing the image.

In the example of the image IM shown in FIG. 10, the representative color of the upper region A1 is light blue, the representative color of the intermediate region A2 is green, and the representative color of the lower region is yellow-green.

The light emission controller 80E controls the light emission of the light source unit 52 via the light source controller 54, and causes the power button 16 which is the light emitting unit to emit light in a predetermined color and pattern. The light emission controller 80E causes the power button 16 to emit light at a predetermined timing. Specifically, the power button 16 emits light in a case where the image to be printed from the external device 100 is received and the image is printed.

In a case where the image to be printed is received from the external device 100, a plurality of predetermined colors is emitted while being switched in order at regular time intervals. For example, seven colors (so-called rainbow colors) of red, orange, yellow, green, light blue, blue, and purple are emitted while being switched in order at regular time intervals.

Meanwhile, in a case where the image is printed, the representative colors of the regions A1, A2, and A3 detected by the representative color detection unit 80D are emitted while being switching in order according to the printing progress. In the present embodiment, the colors are emitted by switching colors in order at time intervals (T/3[s]) in which a time (T[s]) from when the printing is started to when the printing is ended is divided into three equal intervals. The representative color of the upper region A1, the representative color of the intermediate region A2, and the representative color of the lower region A3 are emitted in order. Accordingly, in the case of the image IM shown in FIG. 10, light blue, green, and yellow-green are emitted in order. In a case where the representative color is an achromatic color such as black or gray, light is not emitted. That is, the light emitting unit does not emit light at the timing of the corresponding region (turned off).

In the printer 10 of the present embodiment, the time from when the printing is started to when the printing is ended is a time from when the delivery of the instant film 12 is started to when the discharge of the instant film is completed. The discharge is completed in a case where a rear end of the instant film 12 passes through the transport roller pair 34A. In this state, the instant film 12 is held in a state where the instant film is delivered from the discharge port 18 by a predetermined amount (the instant film is held in a state where the rear end portion is held by the spreading roller pair 34B). The time from the start of printing to the end of printing is constant regardless of the image and is a known value.

External Device

As stated above, the external device 100 is a computer having a communication function, particularly, a mobile computer such as a smartphone, a tablet terminal, a laptop personal computer, PDA, or a mobile phone.

Figure 11:
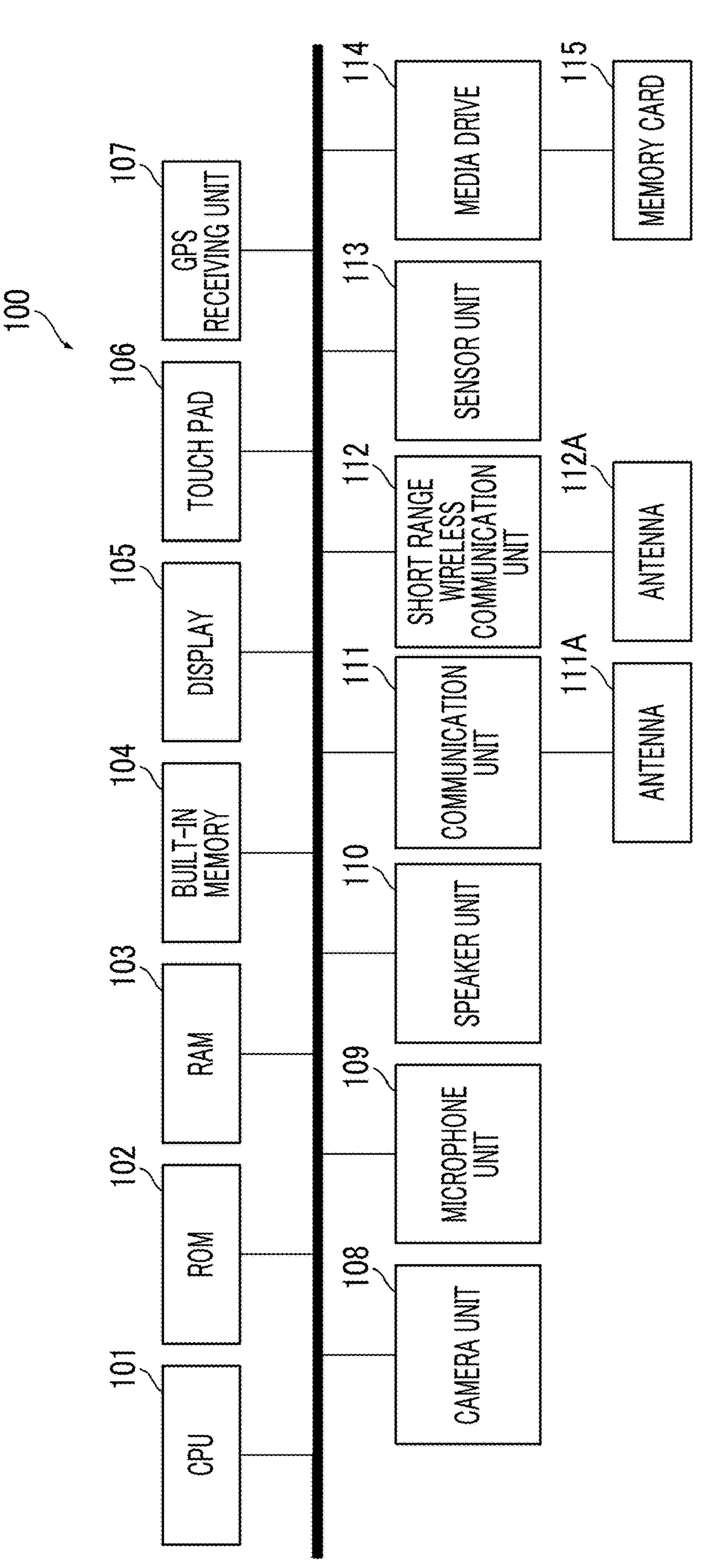
FIG. 11 is a block diagram showing an example of a hardware configuration of an external device.

FIG. 11 is a block diagram showing an example of a hardware configuration of the external device. This diagram shows an example in a case where the external device 100 is a smartphone.

As shown in this diagram, the external device (smartphone) 100 comprises a CPU 101 that controls the entire operation, a ROM 102 that stores a basic input and output program, a RAM 103 that is used as a work area of the CPU 101, a built-in memory 104, a display 105, a touch pad 106 that detects a touch operation (position input) for a display screen, a Global Positioning Systems (GPS) receiving unit 107 that receives a GPS signal including positional information (latitude, longitude, and altitude) of the external device 100 by a GPS satellite or an Indoor MEssaging System (IMES) as an indoor GPS, a camera unit 108 that includes an imaging lens and an image sensor and electronically images an image, a microphone unit 109 that includes a microphone and inputs voice, a speaker unit 110 that includes a speaker and outputs voice, a communication unit 111 that wirelessly communicates with a nearest base station by using an antenna 111A, a short range wireless communication unit 112 that communicates with another device (for example, the printer 10) by using an antenna 112A through short range wireless, a sensor unit 113 that includes various sensors such as a geomagnetic sensor, a gyrocompass, and an acceleration sensor, and a media drive 114 that reads and writes data in and from a memory card 115. The built-in memory 104 is a nonvolatile memory such as an EEPROM. The built-in memory 104 stores various data such as image data of an image captured by the camera unit 108 and image data acquired from other devices in addition to various programs including an operating system executed by the CPU 101.

The external device 100 has a function of causing the printer 10 to print the image captured by the camera unit 108 and a function of causing the printer 10 to print the image recorded in the built-in memory 104 in the relationship with the printer 10. As a function related to these functions, the external device has a function of editing an image to be printed.

Figure 12:
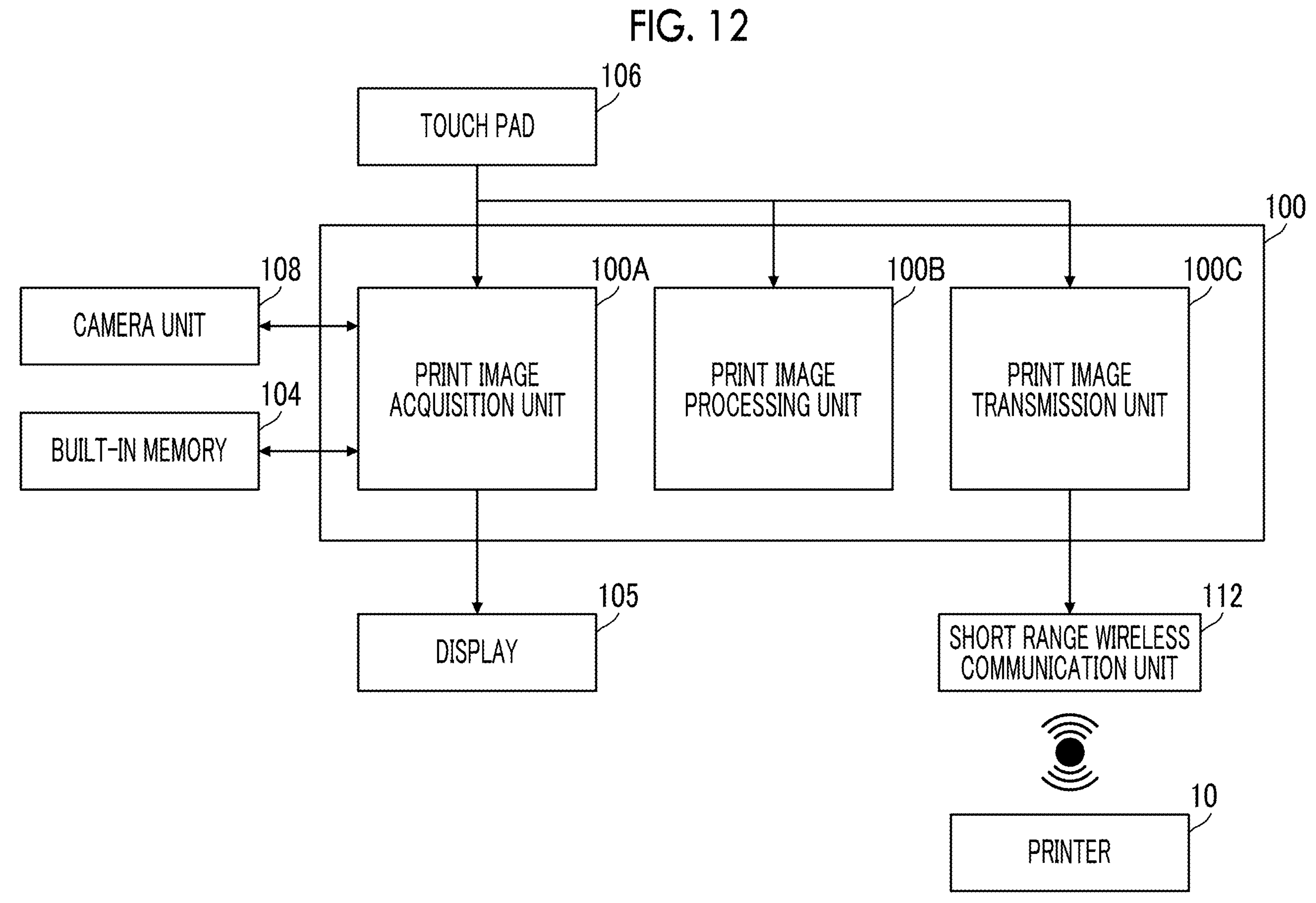
FIG. 12 is a block diagram of main functions of the external device in a relationship with the printer.

FIG. 12 is a block diagram of main functions of the external device in the relationship with the printer.

As shown in this diagram, the external device 100 has functions of a print image acquisition unit 100A that acquires an image to be printed, a print image processing unit 100B that processes and edits an image to be printed, and a print image transmission unit 100C that transmits an image to be printed to the printer 10.

The print image acquisition unit 100A acquires a print image by imaging or from the built-in memory 104. In a case where the print image is acquired by imaging, the external device controls the camera unit 108 based on an operation input (an operation input for the touch pad 106 as an operation unit) from a user, and acquires the image to be printed by imaging. In a case where the print image is acquired from the built-in memory 104, the image stored in the built-in memory 104 is read out and acquired. For example, the external device causes the user to select a folder of a storage destination of the image, reproduce and display the image stored in the folder on the display, and select the image to be printed. The image acquired by the print image acquisition unit 100A is displayed on the display 105.

The print image processing unit 100B processes and edits the image to be printed (the image displayed on the display 105 as the image to be printed) based on the operation input (the operation input for the touch pad 106 as the operation unit) from the user. For example, the print image processing unit performs the image processing such as image trimming, enlargement, rotation, template combination, image correction (noise removal, sharpness, color tone, and brightness).

The print image transmission unit 100C transmits the image to be printed to the printer 10 based on the operation input (the operation input for the touch pad 106 as the operation unit) from the user. The image is transmitted to the printer 10 via the short range wireless communication unit 112.

For example, a print transmission command (print command) is issued by an operation of swiping a screen of the display 105 on which the image to be printed is displayed in a specified direction (for example, a direction from a bottom to a top of the screen). Alternatively, the print transmission command is issued by touching a print button displayed on the screen.

Printing Flow of Printing System of Present Embodiment

In the printing system of the present embodiment, the image to be printed is captured or selected by the external device 100, the captured or selected image is wirelessly transmitted to the printer 10, and the image is printed on the printer 10.

Figure 13:
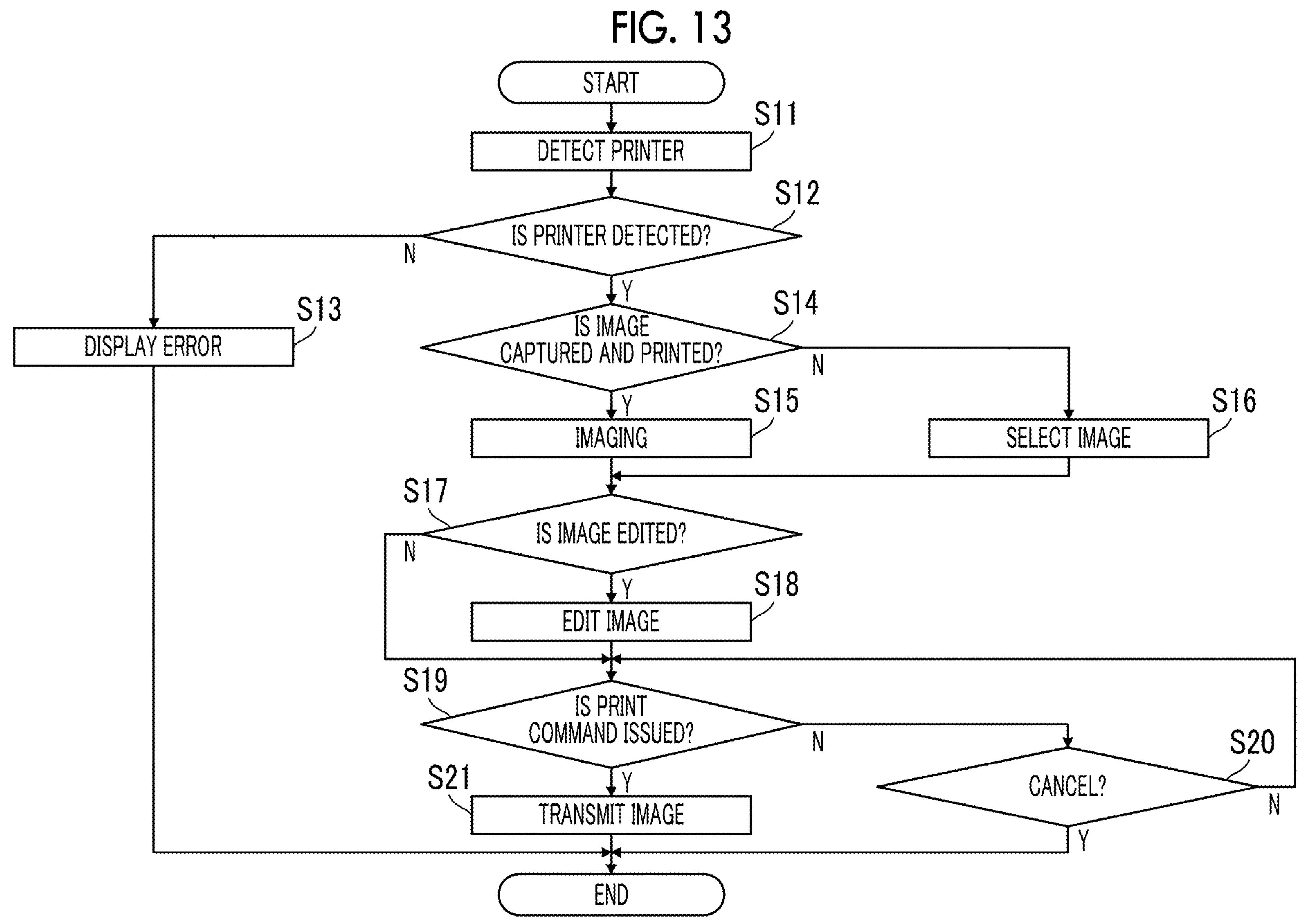
FIG. 13 is a flowchart showing a processing procedure in the external device.

FIG. 13 is a flowchart showing a processing procedure in the external device.

First, the printer 10 is detected (step S11). That is, whether or not there is the printer 10 connectable by short range wireless communication is detected. It is determined whether or not the printer 10 is detected (step S12). In a case where the printer 10 is not detected, an error message is displayed (step S13). For example, an error message such as "there is no connectable printer" is displayed. Meanwhile, in a case where a connectable printer 10 is detected, processing for establishing connection is performed.

In a case where the connection is established, a print mode is determined (step S14). That is, it is determined whether to perform the printing in a mode (imaging print) in which the image is captured and is printed or a mode (reproduction print) in which the image recorded in the built-in memory 104 is selected and printed. The mode is selected on a menu screen.

In a case where the imaging print mode is selected, imaging processing of the image to be printed is performed (step S15). Meanwhile, in a case where the reproduction print mode is selected, the image to be printed is selected (step S16). Accordingly, the image to be printed is acquired. The acquired image is displayed, as the image to be printed, on the display 105.

Next, whether or not the editing of the image is necessary is determined based on the operation input (the operation input for the touch pad 106 as the operation unit) from the user (step S17). Whether or not the editing of the image is necessary is determined by whether or not an image editing operation is performed. In a case where the image editing operation is performed, image editing processing is performed according to the operation input (step S18).

It is determined whether or not the print command is issued based on the operation input from the user (step S19). Here, in a case where the print command is not issued, it is determined whether or not a print cancel command is issued (step S20). In a case where the pint cancel command is issued, the processing is ended. Meanwhile, in a case where the print command is issued, the image is transferred to the printer 10 (step S21).

Figure 14:
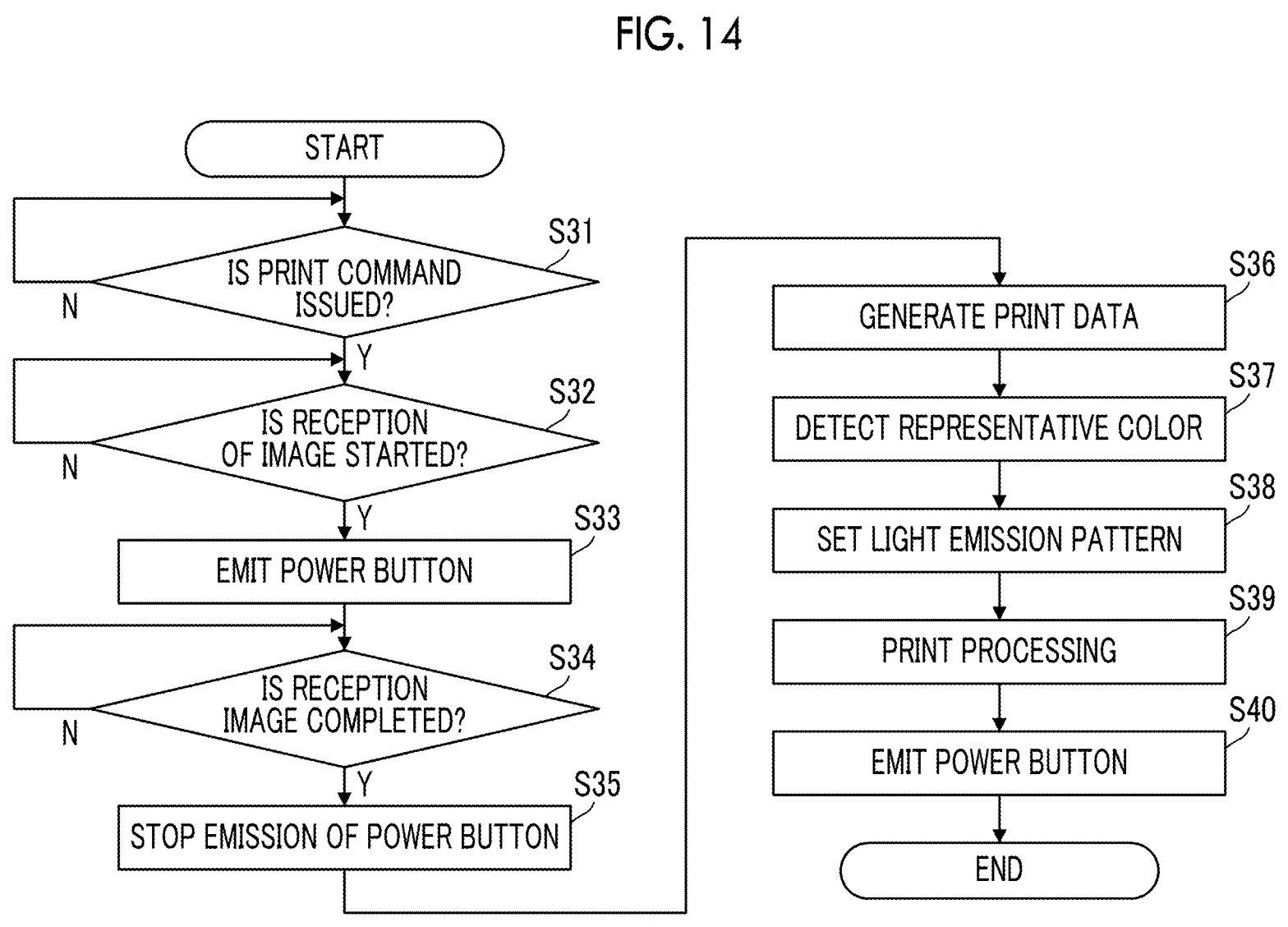

FIG. 14 is a flowchart showing a processing procedure in the printer. It is assumed that the connection with the external device 100 is established.

First, it is determined whether or not the print command is issued (step S31). In a case where the print command is issued, it is determined whether or not the reception of the image is started (step S32). In a case where the reception of the image is started, the power button 16 emits light in a predetermined pattern (step S33). In the printer 10 of the present embodiment, seven colors (so-called rainbow colors) of red, orange, yellow, green, light blue, blue, and purple are emitted while being sequentially switched at regular time intervals. Thereafter, it is determined whether or not the reception of the image is completed (step S34). In a case where the reception of the image is completed, the light emission is stopped (step S35).

Subsequently, the print data is generated from the received image data (step S36). The received image data is analyzed, and the representative colors of the upper, intermediate, and lower regions are detected (step S37). That is, the image is divided into three equal regions into an upper stage, an intermediate stage, and a lower stage along the up-down direction, and the representative color of each divided region is detected.

Subsequently, the light emission pattern of the power button 16 during printing is set based on the detected representative color of each region (step S38). In the printer 10 of the present embodiment, the light emission pattern is set such that the representative color of the upper region, the representative color of the intermediate region, and the representative color of the lower region are emitted while being switched in order at time intervals obtained by dividing the time T (known) from when the printing is started to when the printing is ended into three equal intervals.

Subsequently, the print processing is performed (step S39). The power button 16 emits light with the start of the print processing (step S40). The power button 16 emits light with the set light emission pattern. That is, the representative color of the upper region, the representative color of the intermediate region, and the representative color of the lower region are emitted in order at the time of equally dividing the image to be printed into three equal regions. The light emission colors are emitted while being switched at time intervals obtained by dividing the time T from when the printing is started to when the printing is ended into three equal intervals. The user can recognize the feature and atmosphere of the image to be printed by visually recognizing the light emission of the power button 16. The printing progress state can be recognized by visually recognizing the switching of the light emission.

As described above, according to the printer 10 of the present embodiment, the power button 16 includes the light emitting unit, and emits light in a predetermined aspect during reception and printing of the image to be printed. Accordingly, it is possible to grasp the operation state of the printer 10 from the light emission state of the power button 16. Since the representative colors of the respective regions obtained by dividing the image into three equal regions are emitted in order during the printing, it is possible to recognize the feature and atmosphere of the image to be printed from the light emission state of the power button 16. This is particularly effective in the instant film 12 on which the image cannot be immediately confirmed even though the printing is completed. Since the representative colors of the respective regions are switched in order according to the printing progress during the printing, it is possible to recognize the printing progress state from the light emission state of the power button 16. The interest of the user can be directed to the printer 10 by causing the power button 16 to emit light during the printing. The user can enjoy the printing. In a case where the representative color is detected, it is possible to simplify detection processing by detecting a representative color of a predetermined region (each region obtained by dividing the image into three equal regions in the up-down direction in the present embodiment).

Modification Examples

Modification Example of Detection Aspect of Representative Color

Although it has been described in the aforementioned embodiment that the image to be printed is divided into three equal regions (upper, intermediate, and lower stages) in the up-down direction, and the representative color of each region is detected, the detection aspect of the representative color is not limited thereto. The representative color of each region obtained by dividing the image in narrower regions may be detected.

A division ratio (area ratio) of the regions is not necessarily equal. That is, it is not necessary to equally divide the image. The image may be divided at a predetermined ratio. For example, in a case where the image is divided into three in the up-down direction, the image may be divided that the division ratio (area ratio) of the upper region, the intermediate region, and the lower region is 1:2:1. In this case, it is preferable that the switching of the light emission is performed according to the division ratio (area ratio) of the regions. That is, for example, in a case where the image is divided into three in the up-down direction and the division ratio (area ratio) of the upper region, intermediate region, and lower region is 1:2:1, the time from when the printing is started to when the printing is ended is divided at a ratio of 1:2:1, and the representative colors of the regions are emitted while being switched in order.

The division aspect is not limited to the up-down direction, and the division may be performed into a matrix. In this case, for example, the representative colors detected in the regions are emitted in order by using an upper left region of the image as a start point and a lower right region as an end point. For example, in a case where the image is divided into four in a matrix, the representative colors of the regions are emitted in order of an upper left region, an upper right region, a lower left region, and a lower right region of the image. That is, the light emission order is set so as to scan from the upper left region to the lower right region of the image.

The image may be divided into a plurality of regions concentrically around the center of the image. However, in a case where the image is divided in the up-down direction, since the light emission colors are switched in order along the up-down direction of the image, it is possible to easily grasp the feature and atmosphere of the image compared to other division aspects.

The division of the image needs not cover all the regions of the image as targets. Only a region of a part of the image may be divided as a target. The region from which the representative color is detected may be determined in advance.

For example, in a case where the image to be printed is a combination image, the representative color may be detected for each region of the combined image, and the representative colors may be emitted in order. Here, the combination image mentioned herein includes an image (division image (including a collage image)) obtained by dividing the screen into a plurality of regions and applying images to the divided regions.

Figure 15:
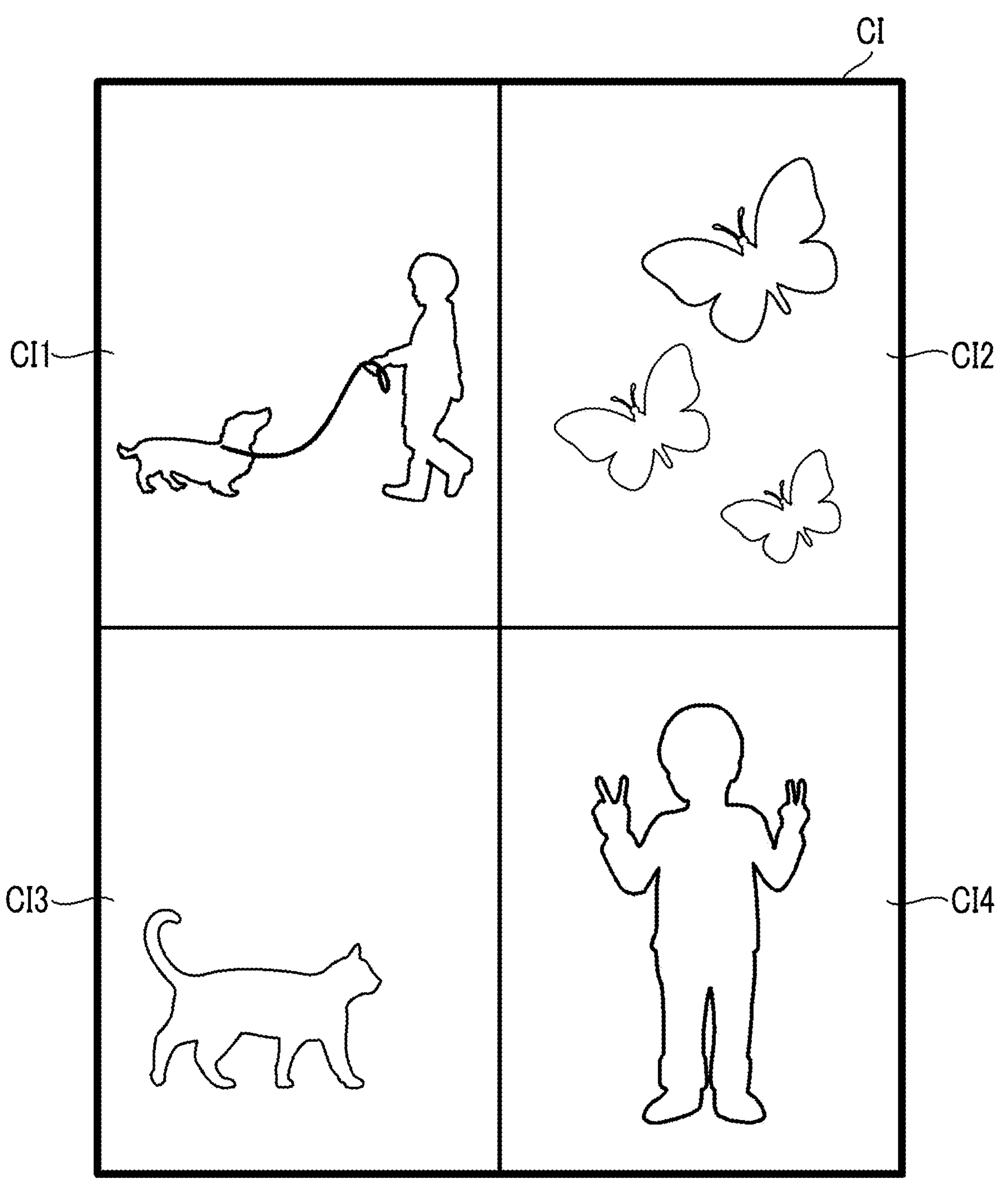
FIG. 15 is a diagram showing an example of a combination image.

FIG. 15 is a diagram showing an example of the combination image.

This diagram shows an example in which the screen is divided into four equal regions in a matrix. In this case, a division image CI includes four images. Specifically, the image includes a first image CI1 in an upper left region of the screen, a second image CI2 in an upper right region of the screen, a third image CI3 in a lower left region of the screen, and a fourth image CI4 in a lower right region of the screen.

The representative color is detected for each area of each image. That is, the representative colors are detected in the region of the first image CI1, the region of the second image CI2, the region of the third image CI3, and the region of the fourth image CI4. Therefore, in this case, the color used centrally in each image is detected as the representative color of each region. That is, the color centrally used in the first image CI1, the color centrally used in the second image CI2, the color centrally used in the third image CI3, and the color centrally used in the fourth image CI4 are detected as the representative colors of the regions.

The light emission pattern is set such that the representative color of the region of the first image CI1, the representative color of the region of the second image CI2, the representative color of the region of the third image CI3, and the representative color of the region of the fourth image CI4 are emitted in order (the light emission order is set so as to scan from the upper left region of the screen toward the lower right region).

Modification Example of Detection Method of Representative Color

Although it has been described in the aforementioned embodiment that the method of obtaining the color distribution of the image of the regions and detecting, as the representative color of the region, the color occupying the largest area is used as the method of detecting the representative color of each region, the method for detecting the representative color is not limited thereto. Other known methods can be employed.

Modification Example of Light Emission Aspect

Although it has been described in the aforementioned embodiment that the representative colors detected from the regions of the image are emitted while being switched in order during the printing, the representative colors may be turned on and off. The printing progress state can be grasped in more detail by turning on and off the representative colors. That is, a time until the printing is completed can be grasped by counting the number of times the representative colors are turned on and off.

In a case where the light emission colors are switched, the emission colors may be switched in a gradation form. Accordingly, for example, even though the same color is detected as the representative color in two consecutive regions, it is possible to recognize the switching of the region from the light emission state. The interest of the user can be more directed to the printer 10 by switching between the light emission colors in a gradation form. The user can enjoy the printing.

Modification Example of Light Emission Aspect in Case Representative Color is Achromatic Color Although it has been described in the aforementioned embodiment that in a case where the representative color of the region is an achromatic color such as black and gray, the light emitting unit (power button 16) does not emit light at a timing when light is emitted in the region, the light emission aspect in a case where the representative color is the achromatic color is not limited thereto. For example, light may be emitted in a predetermined color. Alternatively, a predetermined color may be emitted in a predetermined light emission pattern. For example, white may be turned on and off, or the emission color may be changed to a rainbow color. In a case where a light emitting unit which can emit light at only an outline portion (peripheral edge portion) is employed as the light emitting unit, light may be emitted at only the outline portion in a predetermined color and/or in a predetermined light emission pattern.

Modification Example of Light Emission Aspect in Case Image to be Printed is Received Similarly to a case where the printing is performed, even though the image to be printed is received, light may be emitted in the representative color of the image. In this case, the external device 100 has a function of detecting the representative color.

Figure 16:
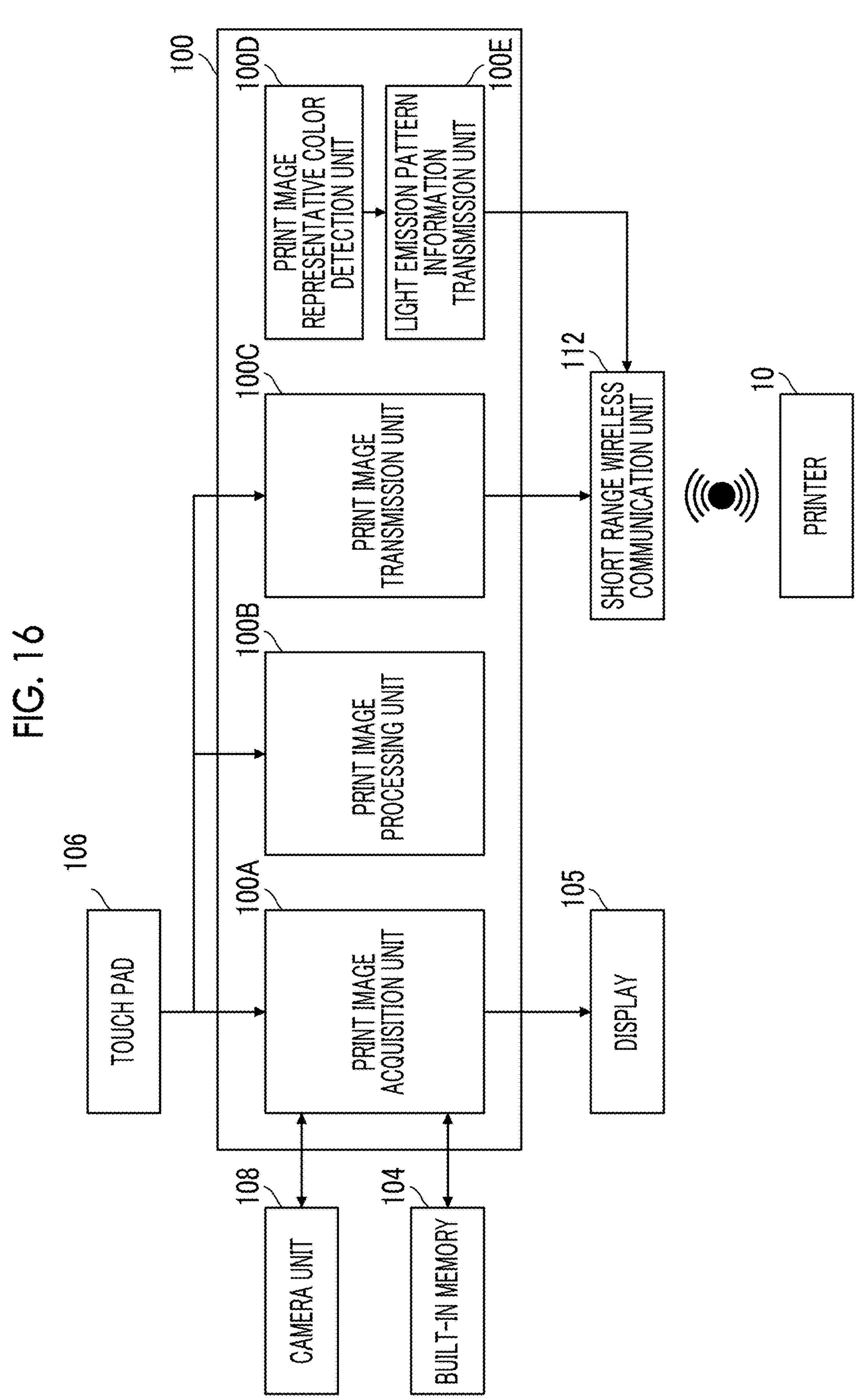
FIG. 16 is a functional block diagram of the external device having a representative color detection function.

FIG. 16 is a functional block diagram of the external device having a representative color detection function.

As shown in this diagram, the external device 100 further has functions of a print image representative color detection unit 100D that detects a representative color of each region from the image to be printed by the printer 10, and a light emission pattern information transmission unit 100E that sets a light emission pattern based on the representative color of each region detected by the print image representative color detection unit 100D and transmits the set light emission pattern to the printer 10.

The print image representative color detection unit 100D divides the image to be printed by the printer 10 into the plurality of regions along the up-down direction of the image, and detects the representative color of each of the divided regions. In the present example, the image is divided into three equal regions in the up-down direction, and the representative color of each region is detected.

Information on the representative color of each region detected by the print image representative color detection unit 100D is added to the light emission pattern information transmission unit 100E.

The light emission pattern information transmission unit 100E sets the light emission pattern of the light emitting unit (power button 16) in a case where the printer 10 receives the image based on the information of the representative color of each region detected by the print image representative color detection unit 100D. In the present example, the light emission pattern is set such that the representative color of the upper region, the representative color of the intermediate region, and the representative color of the lower region are emitted in this order. The information of the set light emission pattern is transmitted to the printer 10. At this time, the light emission pattern information transmission unit 100E transmits the information of the light emission pattern to the printer 10 before the print image transmission unit 100C transmits the print image.

In a case where the printer 10 receives the image to be printed from the external device 100, the printer causes the light emitting unit (power button 16) to emit light according to the information of the light emission pattern received in advance.

FIG. 17 is a block diagram of functions of the printer in a case where the light emitting unit emits light according to the information of the light emission pattern received from the external device.

As shown in this diagram, the printer 10 further has a function of a light emission pattern information acquisition unit 80F that acquires the information of the light emission pattern from the external device 100. The light emission pattern information acquisition unit 80F acquires the information of the light emission pattern transmitted from the external device 100 via the wireless communication unit 56. The function of the light emission pattern information acquisition unit 80F is realized by the printer microcomputer 80.

The light emission pattern information acquired by the light emission pattern information acquisition unit 80F is added to the light emission controller 80E. In a case where the light emission controller 80E receives the image to be printed from the external device 100, the light emission controller causes the light emitting unit (power button 16) to emit light according to the information of the light emission pattern acquired by the light emission pattern information acquisition unit 80F.

As described above, even in a case where the image to be printed is received, the light emitting unit emits light based on the image, and thus, the feature and atmosphere of the image to be printed can be recognized from the light emission state of the light emitting unit. The interest of the user can be directed to the printer 10. The user can enjoy the printing.

In a case where the information of the representative color (the information of the light emission pattern) of the image to be printed can be acquired from the external device 100 as in the present example, the printer 10 does not need to perform the detection processing of the representative color. In a case where the printing is performed, the light emission controller 80E causes the light emitting unit (power button 16) to emit light based on the information of the light emission pattern acquired by the light emission pattern information acquisition unit 80F.

The light emission pattern may be changed depending on whether the image is received or printed. For example, it is possible to change the light emission pattern between the case where the image is received and the case where the image is printed by changing the detection pattern of the representative color between the case where the image is received and the case where the image is printed. For example, in the case where the image is received, the image to be printed is divided into five equal regions in the up-down direction, the representative color of each region is detected, and the light emission pattern is set. Meanwhile, in the case where the image is printed, the image to be printed is divided into three equal regions in the up-down direction, the representative color of each region is detected, and the light emission pattern is set.

A time required for reception is shorter than a time required for printing. Therefore, the light emission pattern in the case where the image is received may be an aspect in which the light emission colors are repeatedly switched at regular time intervals during the reception. Meanwhile, in a case where a time is required for reception, it is preferable that the light emission colors are switched in order according to reception progress. Accordingly, a time until the reception is ended can be grasped from the light emission state of the light emitting unit.

Modification Example of Timing when Light Emitting Unit Emits Light

Although it has been described in the aforementioned embodiment that the light emitting unit emits light in the case where the image to be printed is received and the case where the image is printed, the timing when the light emitting unit emits light is not limited thereto. For example, in a case where the printer is powered on and the case where the printer is powered off, the light may be emitted in a predetermined light emission pattern (for example, the light emission pattern for changing the color to the rainbow color). For example, in a case where a remaining battery amount is less than a threshold value, light may be emitted in a predetermined light emission pattern (for example, red is turned on and off). For example, in a case where the remaining number of instant films 12 runs out or in a case where the remaining number is equal to or less than a predetermined number, light may be emitted in a predetermined light emission pattern. Light may be emitted according to the operation of the external device 100. For example, in a case where the external device 100 images the print image, the external device may emit light in a predetermined light emission pattern. For example, in a case where the print image is edited in the external device 100, light may be emitted according to the editing operation content. In a case where the communication with the external device 100 is established, light may be emitted in a predetermined light emission pattern.

Modification Example of Light Emitting Unit

Although it has been described in the aforementioned embodiment that the power button 16 emits light, a portion that emits light is not limited thereto.

The light emitting unit may be provided at multiple locations. In the case where the plurality of light emitting units is provided, the light emitting units may emit light in order. For example, in a case where the representative color is detected by dividing the image into three regions, the light emitting units may be provided at three locations, and may emit light in order.

Although it has been described in the aforementioned embodiment that the three-color LED is used as the light source of the light emitting unit, the type of the light source is not limited thereto. Any light source capable of switching between the light emission colors may be used. For example, an electroluminescent (EL) source (EL light source) such as an organic light emitting diode (OLED) capable of emitting color light may be employed. From the viewpoint of power consumption, it is preferable that a semiconductor light source is used.

The light source is not limited to a spot light source, and a planar light source can also be used. In this case, a light source capable of changing color in the plane can also be used. Although it has been described in the aforementioned embodiment that the light emitting unit emits light of a reprehensive color of regions being printed by the printing unit, a color of light emitted by the light emitting unit is not limited thereto. For example, a color of light emitted by the light emitting unit may be determined based on reprehensive colors of regions being printed by the printing unit. A color of light emitted by the light emitting unit may also be determined based on reprehensive colors of regions being printed by the printing unit and a table in which a correspondence between representative colors and colors to be emitted by the light emitting unit, or a correspondence between a pattern of representative colors and pattern of colors to be emitted by the light emitting unit is stored in advance.

Modification Example of Communication Aspect

Although it has been described in the aforementioned embodiment that the printer and the external device wirelessly communicate with each other, the communication may be performed in a wired manner. In a case where the communication is performed in a wireless manner, the communication method is not particularly limited, and a known communication method can be employed.

Modification Example of Printer

Although it has been described in the aforementioned embodiment that the present invention is applied to the instant printer, the application of the present invention is not limited thereto. For example, the present invention can be applied to various types of printers such as a thermal printer that prints on thermo-sensitive paper, a thermal transfer printer that prints using an ink ribbon, and an inkjet printer that prints using an inkjet method.

Although it has been described in the aforementioned embodiment that the present invention is applied to the mobile printer, the application of the present invention is not limited thereto. The present invention can also be applied to a so-called stationary printer. In general, since the mobile printer is often used near the user (in an approximately reachable range), the present invention is particularly effective in a case where the present invention is applied to the mobile printer.

Hardware that realizes the functions of the image acquisition unit 80A, the print data generation unit 80B, the print controller 80C, the representative color detection unit 80D, and the light emission controller 80E can be constituted by various processors. Various processors include a central processing unit (CPU) which is a general-purpose processor functioning as various processing units by executing a program, a programmable logic device (PLD) which is a processor capable of changing a circuit configuration after a field programmable gate array (FPGA) is manufactured, and a dedicated electric circuit which is a processor having a circuit configuration designed as a dedicated circuit in order to perform specific processing such as application specific integrated circuit (ASIC). One processing unit constituting an inspection support apparatus may be constituted by one of the various processors described above, or may be constituted by two or more processors of the same type or different types. For example, one processing unit may be constituted by a plurality of FPGAs or a combination of a CPU and an FPGA. Alternatively, the plurality of processing units may be constituted by one processor. Firstly, as the example in which the plurality of processing units is constituted by one processor, there is a form in which one processor is constituted by a combination of one or more CPUs and software and this processor functions as the plurality of processing units as represented by computers such as a client and a server. Second, a processor that realizes the functions of the entire system including the plurality of processing units by using one integrated circuit (IC) chip is used so as to be represented by a System On Chip (SoC). As stated above, various processing units are constituted as hardware structure by using one or more of various processors. More specifically, hardware structures of the various processors are electric circuitry obtained by combining circuit elements such as semiconductor elements.

Modification Example of External Device

The external device is not particularly limited, and can be a digital camera. The external device can also be a desktop personal computer.

EXPLANATION OF REFERENCES

10: printer
12: instant film
12*a*: exposure surface
12*b*: observation surface
12*c*: exposure region
12*d*: pod portion
12*e*: developing solution pod
12*f*: trap portion
12*g*: absorbent
12*h*: observation region
12*i*: frame
14: outer casing
16: power button
18: discharge port
20: film pack lid
22: unlock lever
24: USB cable connection portion cover
30: film pack loading chamber
32: film delivery mechanism
32*a*: claw
34: film transport mechanism
34A: transport roller pair
34B: spreading roller pair
36: print head
40: film pack
42: case
42*a*: exposure opening
42*b*: film discharge port
42*c*: claw opening portion
50: operation detection unit
52: light source unit
54: light source controller
56: wireless communication unit
56A: antenna
58: power supply unit
60: power supply controller
62: printer built-in memory
64: memory controller

66: movement detection unit
68: film delivery mechanism drive unit
70: film transport mechanism drive unit
72: print head drive unit
80: printer microcomputer
80A: image acquisition unit
80B: print data generation unit
80C: print controller
80D: representative color detection unit
80E: light emission controller
80F: light emission pattern information acquisition unit
100: external device
100A: print image acquisition unit
100B: print image processing unit
100C: print image transmission unit
100D: print image representative color detection unit
100E: light emission pattern information transmission unit
101: CPU
102: ROM
103: RAM
104: built-in memory
105: display
106: touch pad
107: GPS receiving unit
108: camera unit
109: microphone unit
110: speaker unit
111: communication unit
111A: antenna
112: short range wireless communication unit
112A: antenna
113: sensor unit
114: media drive
115: memory card
A1: upper region of image
A2: intermediate region of image
A3: lower region of image
CI: division image
CI1: first image constituting division image
CI2: second image constituting division image
CI3: third image constituting division image
CI4: fourth image constituting division image
F: delivery direction of instant film
IM: image
S11-S21: processing procedure in external device in case image is printed
S31 to S40: processing procedure in printer in case image is printed

What is claimed is:

1. A printer comprising:
an outer casing;
a printing unit disposed in an inside of the outer casing;
a light emitting unit capable of switching colors of light emission toward an outside of the outer casing; and
a processor configured to, in a case where the printing unit prints an image:
detect representative colors of regions by dividing the image into a plurality of regions, and
cause the light emitting unit to emit, toward the outside of the outer casing, light of colors while switching the colors based on the representative colors of the regions in order.

2. The printer according to claim 1, wherein the colors are the representative colors of the regions into which the image to be printed is divided along an up-down direction of the image to be printed.

3. The printer according to claim 1, wherein the processor is configured to, in the case where the printing unit prints the image, cause the light emitting unit to emit, toward the outside of the outer casing, the light of the colors while switching the colors in order according to a printing progress of the image to be printed by the printing unit.

4. The printer according to claim 3, wherein the processor is configured to divide a time from when the printing is started to when the printing is ended according to an area ratio of the regions, and cause the light emitting unit to switch the colors at divided time intervals.

5. The printer according to claim 1, wherein the processor is configured to, in the case where the printing unit prints the image, cause the light emitting unit to emit, toward the outside of the outer casing, the light of the colors while switching the colors in a gradation form.

6. The printer according to claim 1, wherein the processor is configured to, in a case where at least one of the representative colors is an achromatic color, cause the light emitting unit to emit, toward the outside of the outer casing, light of a predetermined color instead of the achromatic color.

7. The printer according to claim 6, wherein the processor is configured to, in the case where the at least one of the representative colors is the achromatic color, cause the light emitting unit to emit, toward the outside of the outer casing, light in a predetermined light emission pattern instead of emitting the light of the achromatic color.

8. The printer according to claim 1, wherein the processor is configured to, in a case where at least one of the representative colors is an achromatic color, cause the light emitting unit not to emit, toward the outside of the outer casing, light instead of emitting the light of the achromatic color.

9. The printer according to claim 1, wherein the printing unit is configured to print the image on an instant film.

10. The printer according to claim 1, wherein the printer is a portable mobile printer.

11. A printer comprising:
a printing unit;
a light emitting unit capable of switching colors of light emission; and
a processor configured to:
acquire information of a light emission pattern from an external device;
detect representative colors of regions by dividing an image to be printed by the printing unit into a plurality of regions; and
cause the light emitting unit to emit light in accordance with the acquired information of the light emission pattern,
wherein the light emission pattern is set to cause the light emitting unit to emit light of colors while switching the colors based on the representative colors of the regions in order.

12. The printer according to claim 11, wherein the processor is configured to acquire the image to be printed from the external device.

13. The printer according to claim 12, wherein the processor is configured to acquire the information of the light emission pattern from the external device before acquiring the image to be printed from the external device.

14. The printer according to claim 11, further comprising a wireless communication unit configured to wirelessly communicate with the external device, wherein the processor is configured to wirelessly acquire the information of the light emission pattern from the external device through the wireless communication unit.

15. The printer according to claim 11, wherein the printing unit is configured to print the image on an instant film.

16. The printer according to claim 11, wherein the printer is a portable mobile printer.

17. A method of controlling a printer including an outer casing, a printing unit disposed in an inside of the outer casing, and a light emitting unit capable of switching colors of light emission toward an outside of the outer casing, the method comprising:

causing the printing unit to print an image;

detecting representative colors of regions by dividing the image into a plurality of regions; and causing the light emitting unit to emit, toward the outside of the outer casing, light of colors while switching the colors based on the representative colors of the regions in order.

18. A method of controlling a printer including a printing unit and a light emitting unit capable of switching colors of light emission, the method comprising:

acquiring information of a light emission pattern from an external device;

detecting representative colors of regions by dividing an image to be printed by the printing unit into a plurality of regions; and causing the light emitting unit to emit light in accordance with the acquired information of the light emission pattern, wherein the light emission pattern is set to cause the light emitting unit to emit light of colors while switching the colors based on the representative colors of the regions in order.

19. The method according to claim 18, further comprising acquiring the image to be printed from the external device.

20. The method according to claim 18, further comprising wirelessly acquiring the information of the light emission pattern from the external device through a wireless communication unit.

* * * * *